(12) United States Patent
Chiu et al.

(10) Patent No.: US 12,361,732 B2
(45) Date of Patent: Jul. 15, 2025

(54) SYSTEM AND METHOD FOR EFFICIENT VISUAL NAVIGATION

(71) Applicant: SRI International, Menlo Park, CA (US)

(72) Inventors: Han-Pang Chiu, West Windsor, NJ (US); Zachary Seymour, Pennington, NJ (US); Niluthpol C. Mithun, Lawrenceville, NJ (US); Supun Samarasekera, Skillman, NJ (US); Rakesh Kumar, West Windsor, NJ (US); Kowshik Thopalli, Tempe, AZ (US); Muhammad Zubair Irshad, Atlanta, GA (US)

(73) Assignee: SRI International, Menlo Park, CA (US)

( * ) Notice: Subject to any disclaimer, the term of this patent is extended or adjusted under 35 U.S.C. 154(b) by 613 days.

(21) Appl. No.: 17/554,671

(22) Filed: Dec. 17, 2021

(65) Prior Publication Data
US 2022/0198813 A1    Jun. 23, 2022

Related U.S. Application Data

(60) Provisional application No. 63/126,981, filed on Dec. 17, 2020.

(51) Int. Cl.
*G06K 9/00* (2022.01)
*G01C 21/36* (2006.01)
(Continued)

(52) U.S. Cl.
CPC ......... *G06V 20/70* (2022.01); *G01C 21/3635* (2013.01); *G06N 3/02* (2013.01); *G06V 20/56* (2022.01)

(58) Field of Classification Search
CPC ................................. G06N 3/02; G06V 10/82
See application file for complete search history.

(56) References Cited

U.S. PATENT DOCUMENTS

| 11,830,253 B2 * | 11/2023 | Tang | G06V 10/751 |
| 2018/0161986 A1 * | 6/2018 | Kee | G06V 20/10 |

(Continued)

FOREIGN PATENT DOCUMENTS

WO    WO-2021058090 A1 *  4/2021  ......... G01C 21/3629

OTHER PUBLICATIONS

Lydia E Kavraki, Petr Svestka, J-C Latombe, and Mark H Overmars. Probabilistic roadmaps for path planning in high-dimensional configuration spaces. IEEE transactions on Robotics and Automation, 12(4):566-580, 1996.

(Continued)

*Primary Examiner* — Molly Wilburn
*Assistant Examiner* — Aidan Keup
(74) *Attorney, Agent, or Firm* — MOSER TABOADA

(57) ABSTRACT

A method, apparatus and system for efficient navigation in a navigation space includes determining semantic features and respective 3D positional information of the semantic features for scenes of captured image content and depth-related content in the navigation space, combining information of the determined semantic features of the scene with respective 3D positional information using neural networks to determine an intermediate representation of the scene which provides information regarding positions of the semantic features in the scene and spatial relationships among the semantic features, and using the information regarding the positions of the semantic features and the spatial relationships among the semantic features in a machine learning process to provide at least one of a navigation path in the navigation space, a model of the navigation space, and an (Continued)

explanation of a navigation action by the single, mobile agent in the navigation space.

21 Claims, 14 Drawing Sheets

(51) Int. Cl.
  *G06N 3/02* (2006.01)
  *G06V 20/56* (2022.01)
  *G06V 20/70* (2022.01)

(56) References Cited

U.S. PATENT DOCUMENTS

| | | | |
|---|---|---|---|
| 2021/0141383 A1* | 5/2021 | Silander | G06V 20/10 |
| 2021/0248375 A1* | 8/2021 | Geng | G06F 16/9035 |
| 2021/0276595 A1* | 9/2021 | Casas | G06V 30/19173 |
| 2022/0111869 A1* | 4/2022 | Liu | G06V 20/647 |

OTHER PUBLICATIONS

Andrew J Davison and David W Murray. Mobile robot localisation using active vision. In ECCV, pp. 809-825, 1998.
Sebastian Thrun, Maren Bennewitz, Wolfram Burgard, Armin B Cremers, Frank Dellaert, Dieter Fox, Dirk Hahnel, Charles Rosenberg, Nicholas Roy, Jamieson Schulte, et al. Minerva: A second-generation museum tour-guide robot. In ICRA, vol. 3. IEEE, 1999.
Iro Armeni, Ozan Sener, Amir R Zamir, Helen Jiang, Ioannis Brilakis, Martin Fischer, and Silvio Savarese. 3d semantic parsing of large-scale indoor spaces. In CVPR, pp. 1534-1543, 2016.
Kaiming He, Xiangyu Zhang, Shaoqing Ren, and Jian Sun. Deep residual learning for image recognition. In CVPR, pp. 770-778, 2016.
Max Jaderberg, Volodymyr Mnih, Wojciech Marian Czarnecki, Tom Schaul, Joel Z Leibo, David Silver, and Koray Kavukcuoglu. Reinforcement learning with unsupervised auxiliary tasks. arXiv preprint arXiv:1611.05397, 2016.
Manolis Savva, Angel X. Chang, Alexey Dosovitskiy, Thomas A. Funkhouser, and Vladlen Koltun. Minos: Multimodal indoor simulator for navigation in complex environments. arXiv preprint arXiv:1712.03931, 2017.
Saurabh Gupta, James Davidson, Sergey Levine, Rahul Sukthankar, and Jitendra Malik. Cognitive mapping and planning for visual navigation. In CVPR, pp. 7272-7281, 2017.
Saurabh Gupta, David Fouhey, Sergey Levine, and Jitendra Malik. Unifying map and landmark based representations for visual navigation. arXiv preprint arXiv:1712.08125, 2017.
Shuran Song, Fisher Yu, Andy Zeng, Angel X Chang, Manolis Savva, and Thomas Funkhouser. Semantic scene completion from a single depth image. In CVPR, pp. 1746-1754, 2017.
Claudia Yan, Dipendra Misra, Andrew Bennnett, Aaron Walsman, Yonatan Bisk, and Yoav Artzi. Chalet: Cornell house agent learning environment. arXiv preprint arXiv:1801.07357, 2018.
Fei Xia, Amir Roshan Zamir, Zhi-Yang He, Alexander Sax, Jitendra Malik, and Silvio Savarese. Gibson Env: Real-world perception for embodied agents. In CVPR, pp. 9068-9079, 2018.
Peter Anderson, Angel X. Chang, Devendra Singh Chaplot, Alexey Dosovitskiy, Saurabh Gupta, Vladlen Koltun, Jana Kosecka, Jitendra Malik, Roozbeh Mottaghi, Manolis Savva, and Amir Roshan Zamir. On evaluation of embodied navigation agents. arXiv preprint arXiv:1807.06757, 2018.
Tianyi Wu, Sheng Tang, Rui Zhang, and Yongdong Zhang. Cgnet: A light-weight context guided network for semantic segmentation. arXiv preprint arXiv: 1811.08201, 2018.
Dmytro Mishkin, Alexey Dosovitskiy, and Vladlen Koltun. Benchmarking classic and learned navigation in complex 3d environments. arXiv preprint arXiv:1901.10915, 2019.
Erik Wijmans, Abhishek Kadian, Ari Morcos, Stefan Lee, Irfan Essa, Devi Parikh, Manolis Savva, and Dhruv Batra. Decentralized distributed ppo: Solving pointgoal navigation. arXiv preprint arXiv:1911.00357, 2019.
Federico Landi, Lorenzo Baraldi, Massimiliano Corsini, and Rita Cucchiara. Embodied vision-and-language navigation with dynamic convolutional filters. In BMVC, 2019.
William B. Shen, Danfei Xu, Yuke Zhu, Leonidas J. Guibas, Fei-Fei Li, and Silvio Savarese. Situational fusion of visual representation for visual navigation. In ICCV, 2019.
Wei Yang, XiaolongWang, Ali Farhadi, Abhinav Gupta, and Roozbeh Mottaghi. Visual semantic navigation using scene priors. arXiv preprint arXiv:1810.06543, 2018.
Han Zhang, Ian J. Goodfellow, Dimitris N. Metaxas, and Augustus Odena. Self-attention generative adversarial networks. In ICML, vol. 97 of Proceedings of Machine Learning Research, pp. 7354-7363. PMLR, 2019.
Guilherme N DeSouza and Avinash C Kak. Vision for mobile robot navigation: A survey. IEEE transactions on pattern analysis and machine intelligence, 24(2):237-267, 2002.

* cited by examiner

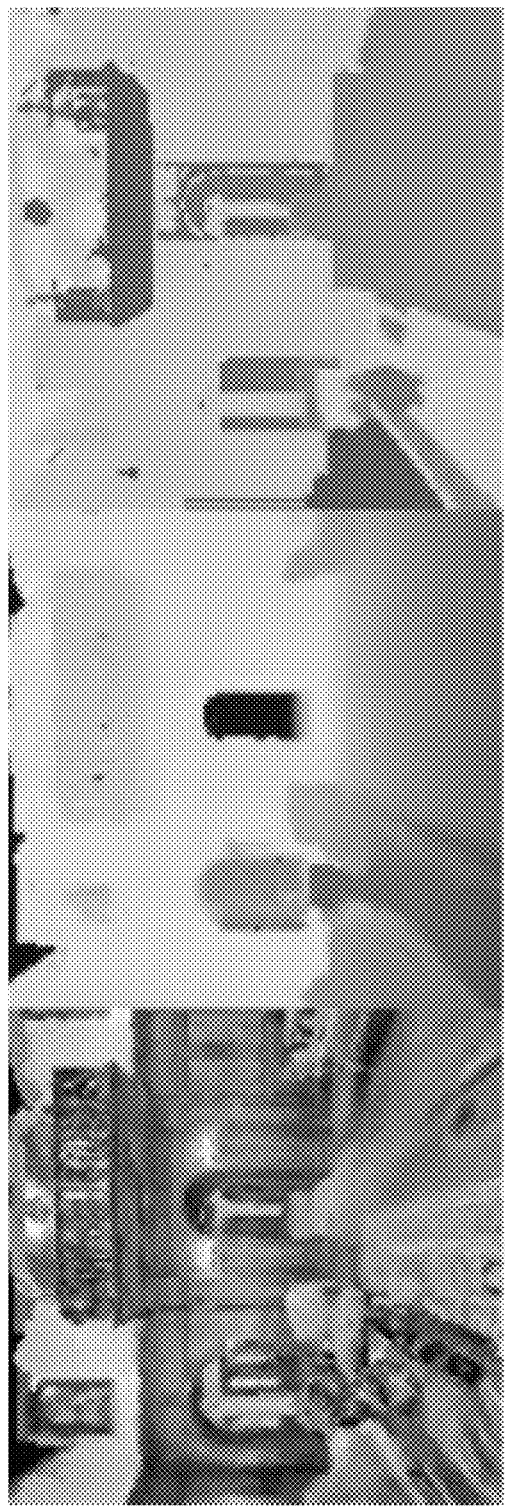
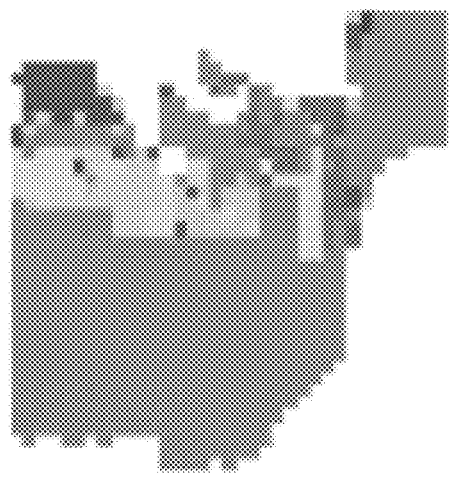
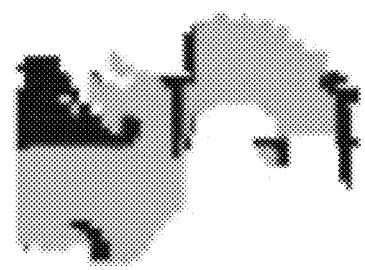
FIG. 5A FIG. 5B FIG. 5C FIG. 5D FIG. 5E FIG. 5F

| Method | | Map | Goal | Exploration | SPL (%) | Succ(%) |
|---|---|---|---|---|---|---|
| RGB-D [9] | RL (PPO) | | ✓ | | 34 | 51 |
| RGB-D [9] | SLAM | | | | 42 | - |
| RGBD+OCC [12] | RL (PPO) | Occupancy | ✓ | ✓ | 43 | 52 |
| MaAST | RL (PPO) | Semantic | ✓ | ✓ | 47 | 54 |

FIG. 8

| Model | Training Regime | | | Validation Seen | | | | | | Validation Unseen | | | | | |
|---|---|---|---|---|---|---|---|---|---|---|---|---|---|---|---|
| | Teacher-Forcing [50] | DAGGER [38] | | SR ↑ | SPL ↑ | NDTW ↑ | TL ↓ | NE ↓ | | SR ↑ | SPL ↑ | NDTW ↑ | TL ↓ | NE ↓ | |
| Random | | | | 0.02 | 0.02 | 0.28 | 3.54 | 10.20 | | 0.03 | 0.02 | 0.30 | 3.74 | 9.51 | |
| Forward-Only | | | | 0.04 | 0.04 | 0.33 | 3.83 | 9.56 | | 0.03 | 0.02 | 0.30 | 3.71 | 10.34 | |
| Seq2Seq | ✓ | | | 0.25 | 0.24 | 0.47 | 8.15 | 8.49 | | 0.17 | 0.16 | 0.43 | 7.55 | 8.91 | |
| | ✓ | ✓ | | 0.32 | 0.31 | 0.51 | 8.49 | 7.61 | | 0.19 | 0.17 | 0.43 | 7.78 | 8.69 | |
| Seq2Seq-SM | ✓ | | | 0.26 | 0.25 | 0.48 | 7.92 | 8.13 | | 0.16 | 0.15 | 0.41 | 7.54 | 9.14 | |
| | ✓ | ✓ | | 0.30 | 0.28 | 0.49 | 8.58 | 7.98 | | 0.19 | 0.17 | 0.43 | 7.69 | 8.98 | |
| CMA | ✓ | | | 0.24 | 0.23 | 0.47 | 7.94 | 8.69 | | 0.19 | 0.18 | 0.44 | 6.96 | 8.52 | |
| | ✓ | ✓ | | 0.28 | 0.26 | 0.49 | 8.43 | 8.12 | | 0.20 | 0.18 | 0.44 | 7.67 | 8.72 | |
| CMA-SM | ✓ | | | 0.27 | 0.25 | 0.48 | 8.44 | 8.25 | | 0.18 | 0.16 | 0.44 | 7.52 | 8.73 | |
| | ✓ | ✓ | | 0.29 | 0.28 | 0.49 | 8.49 | 7.79 | | 0.19 | 0.18 | 0.43 | 7.70 | 8.92 | |
| SASRA (Proposed) | ✓ | | | 0.27 | 0.25 | 0.46 | 8.84 | 8.48 | | 0.22 | 0.21 | 0.44 | 8.05 | 8.75 | |
| | ✓ | ✓ | | 0.36 | 0.34 | 0.53 | 8.89 | 7.17 | | 0.24 | 0.22 | 0.47 | 7.89 | 8.32 | |

FIG. 10

SYSTEM AND METHOD FOR EFFICIENT VISUAL NAVIGATION

CROSS-REFERENCE TO RELATED APPLICATIONS

This application claims benefit of and priority to U.S. Provisional Patent Application Ser. No. 63/126,981, filed Dec. 17, 2020, which is herein incorporated by reference in its entirety.

FIELD

Embodiments of the present principles generally relate to a method, apparatus and system for efficient visual navigation and, more particularly, to a method, apparatus and system for efficient visual navigation using intermediate image representations and attention mechanisms.

BACKGROUND

Understanding the geometric relationships between objects in a scene is a core capability in enabling autonomous agents to navigate in new environments. A sparse, unified representation of the scene topology will enable agents to act efficiently to move through an environment, communicate the environment state with others, and utilize a determined representation for diverse downstream tasks. Recently, deep reinforcement learning (DRL) methods demonstrated promising results for autonomous agents on navigation tasks, by learning a direct mapping from observations to actions through trial-and-error interactions with its environments.

However, most of these methods are purely data driven without constructing intermediate representations. That is, learning-based methods, with DRL leading the way, are being developed, which directly learn a mapping from observations to actions through trial-and-error interactions with its environment. Such methods have demonstrated promising results on navigation tasks and showed superior performance compared to geometry-based methods, however, current state-of-the-art DRL methods require training with massive amounts of data observations to achieve satisfactory performance because they lack the semantic reasoning capabilities that humans possess to quickly learn from past experience and extrapolate to new environments. Hundreds of millions of interactions with the training environments requiring enormous computational resources and distributed processing is mandatory to converge to a reasonable policy for complicated scenarios.

There currently exist no current methods or systems for generating a powerful but cost-effective scene representation, that encodes both semantic objects and their geometric relationships.

SUMMARY

Embodiments of methods, apparatuses and systems for efficient visual navigation using enhanced image representations and attention mechanisms are disclosed herein.

In some embodiments a method for efficient visual navigation includes determining semantic features and respective 3D positional information of the semantic features for scenes of captured image content and depth-related content in the navigation space, combining information of at least one the determined semantic features of the scene with respective 3D positional information using neural networks to determine an intermediate representation of the scene which provides information regarding positions of the semantic features in the scene and spatial relationships among the semantic features, and using the information regarding the positions of the semantic features and the spatial relationships among the semantic features from the intermediate representations determined for captured scenes of the navigation space in a machine learning process to provide at least one of a navigation path in the navigation space, a model of the navigation space, and an explanation of a navigation action by the single, mobile agent in the navigation space.

In some embodiments the method can further include using the information regarding the positions of the semantic features and the spatial relationships among the semantic features from the intermediate representations determined for captured scenes of the navigation space in, for example, a deep reinforced learning process, to train the single, mobile agent to navigate the navigation space, wherein the use of the intermediate representations to train the single, mobile agent reduces an amount of training data required to successfully train the single, mobile agent to navigate the navigation space compared to training instances in which the intermediate representations are not used.

In some embodiments, the method can further include utilizing at least one region of interest in at least one scene of the captured content to identify which semantic features of the at least one scene of the captured content to include in the intermediate representation, where, in some embodiments, the at least one region of interest is determined based on a spatial relationship between semantic features of the at least one scene of the captured content and the single, mobile agent.

In some embodiments, the intermediate representation can include at least one of a scene graph comprising at least two nodes representative of respective, at least two semantic features of at least one captured scene of the navigation space and at least one edge representative of a spatial relationship between the at least two semantic features of at least one captured scene of the navigation space and a semantic map representation in which the semantic map representation depicts a spatial relationship between semantic features of captured scenes with respect to a position of the single mobile agent in the navigation space.

In some embodiments, the method can further include identifying a spatial relationship between at least one of semantic features of a scene and positional information of the semantic features of the scene and at least a portion of language instructions provided for navigating through the navigation space, where, in some embodiments, completed portions of the language instructions are used to enable a determination of a next action for navigation through the navigation space.

In some embodiments, the method described above can further include separating semantic features of a scene by class and combining respective classes of semantic features with respective 3D positional information using neural networks to determine an intermediate representation of the scene categorized according to semantic class.

In some embodiments, the method described can further include predicting a next action for the agent in the navigation space based on a previous action taken by the agent and information from at least one determined intermediate representation.

In some embodiments, the method can further include training a navigation model for the single, mobile agent by causing sensors associated with the single, mobile agent to capture scenes while traversing multiple environments, determining respective intermediate representations for the captured scenes, and applying information from the respective intermediate representations to a machine learning process for determining the navigation model. In some embodiments, the navigation model and an inference of a machine learning process are implemented to assist the single, mobile agent to at least one of learn and navigate an unknown environment.

In some embodiments in accordance with the present principles, a non-transitory machine-readable medium has stored thereon at least one program, the at least one program including instructions which, when executed by a processor, cause the processor to perform a method in a processor based system for efficient visual navigation including determining semantic features and respective 3D positional information of the semantic features for scenes of captured image content and depth-related content in the navigation space, combining information of at least one the determined semantic features of the scene with respective 3D positional information using neural networks to determine an intermediate representation of the scene which provides information regarding positions of the semantic features in the scene and spatial relationships among the semantic features, and using the information regarding the positions of the semantic features and the spatial relationships among the semantic features from the intermediate representations determined for captured scenes of the navigation space in a machine learning process to provide at least one of a navigation path in the navigation space, a model of the navigation space, and an explanation of a navigation action by the single, mobile agent in the navigation space.

In some embodiments the method of the non-transitory machine-readable medium can further include using the information regarding the positions of the semantic features and the spatial relationships among the semantic features from the intermediate representations determined for captured scenes of the navigation space in, for example, a deep reinforced learning process, to train the single, mobile agent to navigate the navigation space, wherein the use of the intermediate representations to train the single, mobile agent reduces an amount of training data required to successfully train the single, mobile agent to navigate the navigation space compared to training instances in which the intermediate representations are not used.

In some embodiment, the method of the non-transitory machine-readable medium can further include utilizing at least one region of interest in at least one scene of the captured content to identify which semantic features of the at least one scene of the captured content to include in the intermediate representation, where, in some embodiments, the at least one region of interest is determined based on a spatial relationship between semantic features of the at least one scene of the captured content and the single, mobile agent.

In some embodiments, the method of the non-transitory machine-readable medium can further include identifying a spatial relationship between at least one of semantic features of a scene and positional information of the semantic features of the scene and at least a portion of language instructions provided for navigating through the navigation space, where, in some embodiments, completed portions of the language instructions are used to enable a determination of a next action for navigation through the navigation space.

In some embodiments, the method of the non-transitory machine-readable medium described above can further include separating semantic features of a scene by class and combining respective classes of semantic features with respective 3D positional information using neural networks to determine an intermediate representation of the scene categorized according to semantic class.

In some embodiments, the method of the non-transitory machine-readable medium described can further include predicting a next action for the agent in the navigation space based on a previous action taken by the agent and information from at least one determined intermediate representation.

In some embodiments, the method of the non-transitory machine-readable medium can further include training a navigation model for the single, mobile agent by causing sensors associated with the single, mobile agent to capture scenes while traversing multiple environments, determining respective intermediate representations for the captured scenes, and applying information from the respective intermediate representations to a machine learning process for determining the navigation model. In some embodiments, the navigation model and an inference of a machine learning process are implemented to assist the single, mobile agent to at least one of learn and navigate an unknown environment.

In some embodiments, a system for efficient visual navigation includes a processor and a memory coupled to the processor, in which the memory has stored therein at least one of programs or instructions executable by the processor to configure the system to determine semantic features and respective 3D positional information of the semantic features for scenes of captured image content and depth-related content in the navigation space, combine information of at least one the determined semantic features of the scene with respective 3D positional information using neural networks to determine an intermediate representation of the scene which provides information regarding positions of the semantic features in the scene and spatial relationships among the semantic features, and use the information regarding the positions of the semantic features and the spatial relationships among the semantic features from the intermediate representations determined for captured scenes of the navigation space in a machine learning process to provide at least one of a navigation path in the navigation space, a model of the navigation space, and an explanation of a navigation action by the single, mobile agent in the navigation space.

In some embodiments, the system is further configured to use the information regarding the positions of the semantic features and the spatial relationships among the semantic features from the intermediate representations determined for captured scenes of the navigation space to train the single, mobile agent to navigate the navigation space, wherein the use of the intermediate representations to train the single, mobile agent reduces an amount of training data required to successfully train the single, mobile agent to navigate the navigation space compared to training instances in which the intermediate representations are not used.

In some embodiments, the system is further configured to utilize at least one region of interest in at least one scene of the captured content to identify which semantic features of the at least one scene of the captured content to include in the intermediate representation.

In some embodiments, the system if further configured to identify a spatial relationship between at least one of semantic features of a scene and positional information of the semantic features of the scene and at least a portion of language instructions provided for navigating through the navigation space.

In some embodiments, the system is further configured to separate semantic features of a scene by class and combining respective classes of semantic features with respective 3D positional information using neural networks to determine an intermediate representation of the scene categorized according to semantic class.

In some embodiments, the system is further configured to predict a next action for the agent in the navigation space based on a previous action taken by the agent and information from at least one determined intermediate representation.

In some embodiments a method for efficient visual navigation includes determining semantic information and 3D positional information of objects of at least one scene of received content, determining a graph representation of the at least one scene of the received content by combining the semantic information of the objects with encoded positional information of the objects and providing object location information in the navigation space using neural networks and the determined graph representation, the object location information capable of being used to navigate through the navigation space.

In some embodiments, the system is further configured to train a navigation model for the single, mobile agent by causing sensors associated with the single, mobile agent to capture scenes while traversing multiple environments, determine respective intermediate representations for the captured scenes, and apply information from the respective intermediate representations to a machine learning process for determining the navigation model. In some embodiments, the navigation model and an inference of a machine learning process are implemented to assist the single, mobile agent to at least one of learn and navigate an unknown environment.

In some embodiments a method for efficient visual navigation includes determining semantic features and respective 3D positional information of the semantic features for scenes of captured image content and depth-related content in the navigation space, for each of the scenes, combining at least one the determined semantic features with at least one of the respective 3D positional information using neural networks to determine an intermediate representation of the scene which provides information regarding positions of the semantic features in the scene and spatial relationships among the semantic features, and using the information regarding the positions of the semantic features and the spatial relationships among the semantic features from the intermediate representations determined for captured scenes of the navigation space to train an agent to navigate the navigation space, wherein the use of the intermediate representations to train the agent reduces an amount of training required to successfully train the agent to navigate the navigation space compared to training instances in which the intermediate representations are not used.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 5A depicts an RGB image captured by, for example, the RGB camera of FIG. 1.

FIG. 5B depicts a Depth image colorized with Turbo captured by, for example, the Lidar sensor of FIG. 1.

FIG. 5C depicts a semantic segmentation mask of, for example, the RGB image of FIG. 5A.

FIG. 5D depicts an occupancy map, where green denotes traversable space and blue denotes obstacles.

FIG. 5E depicts a semantic map of, for example, the RGB image of FIG. 5A.

FIG. 5F depicts a ground truth map of a path traversed by an agent.

FIG. 8 depicts a table comparing the Semantic map building network in accordance with an embodiment of the present principles with several baselines on the MatterPort3D validation set.

FIG. 10 depicts a table of results of an example embodiment of the present principles compared against several baselines, evaluated on VLN-CE dataset.

Figure 1:
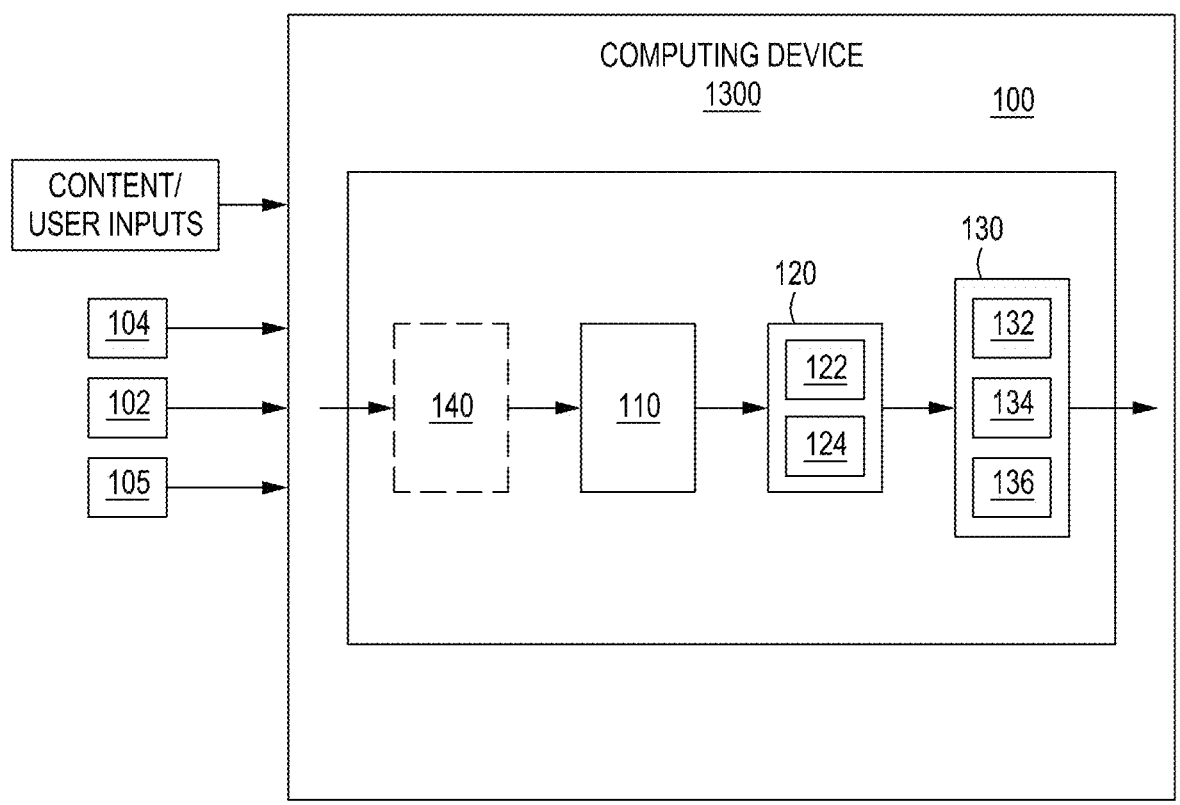
FIG. 1 depicts a high-level block diagram of a system for efficient visual navigation in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for efficient visual navigation using enhanced image representations and attention mechanisms. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific sensors and respective data collected by the sensors, such teachings should not be considered limiting. Embodiments in accordance with the present principles can function with substantially any content data and can include other, not shown, sensors.

Embodiments of the present principles provide a method, apparatus and system that address performance of an agent in a navigation space/environment and enable the encoding of vital semantic information alongside raw sensor streams (visual streams such as videos) in an immediate representation, such as maps, graphs and the like, inside a learning framework, such as a Deep Learning Network and/or an imitation Learning (IL) network and the like.

In embodiments described herein, an agent can include at least a robot, an autonomous vehicle, a computer on a movable platform, and/or any other mobile application capable of receiving and processing navigation information and instructions for understanding/navigating a navigation space/environment.

Embodiments of the present principles further provide a novel formation of the attention mechanism of a Transformer, in one embodiment referred to as a Scene Graph Transformer Network/module and in another embodiment referred to as an Semantic-Linguistic Attention Map Transformer (SLAM-T) module/egocentric map Transformer, to encourage an agent to learn pertinent objects and regions based on their spatial relationship to the agent. The attention mechanism of the present principles automatically focuses on relevant parts of a map memory structure in order to determine a next action to take (described in greater detail below). That is, embodiments of the present principles provide a novel method for improving visual feature representations in learning-based visual navigation systems. By using structurally and semantically refined features produced from, for example a Scene Graph or semantic map of the present principles, the navigational success and sample efficiency of learning-based models increases.

In some embodiments of the present principles, by incorporating human language instructions as additional system inputs, a system of the present principles supports a visual learning network (VLN) application. In some embodiments an agent can utilize a given text instruction to perform a complicated task in a known and new unseen environment. For example, the instruction can be "Leave the bedroom, enter the kitchen, walk towards patio, take a left at lamp, stop in front of the window near couch" and the like. The agent can understand complex human instructions to perform these tasks in the real world, based on what the agent observes from the environment in accordance with the present principles. Relationships among system inputs (text instructions, raw visual sensor streams) and any immediate representation (such as maps or graphs) can be learned to improve the performance.

Embodiments of the present principles can be applicable to many mobile applications, including point-goal navigation (moving from point A to point B within a new environment), object-goal navigation (finding object A in a new environment), and exploration (cover an entire new environment as soon as possible).

FIG. 1 depicts a high-level block diagram of a system 100 for efficient visual navigation in accordance with an embodiment of the present principles. The system 100 of FIG. 1 illustratively comprises a pre-processing module 110, a graph representation module 120, a natural language navigation module 130 and an optional region of interest (ROI) module 140. In the embodiment of FIG. 1, the natural language navigation module 130 illustratively comprises a Semantic-Linguistic Attention Map Transformer (SLAM-T) module 132, a RGBD-Linguistic Cross Modal Transformer module 134, and a Hybrid Action Decoder module 136.

In some embodiments of the present principles described herein, at least a portion of the functionality of some of the modules of the system 100 for efficient visual navigation in accordance with an embodiment of the present principles are described as implementing novel Transformers. Such described Transformers, in some embodiments, take the form of deep learning models that facilitate the implementation of attention mechanisms (described in greater detail below).

In some embodiments of a system for efficient visual navigation of the present principles, such as the system 100 for efficient visual navigation of FIG. 1, the optional ROI module 140 determines a bounding box for focusing on desired portions of a scene. For example, in some embodiments the ROI module 140 can determine regions of interest (ROIs) in, for example, a received RGB image. Each ROI can correspond to one of the objects/semantic features defined in a given scene of the RGB image, for example, one of the defined Matterport object classes. In some embodiments a complete intermediate representation (e.g., scene graph) can be constructed between all of the object nodes and message passing can be utilized to label the edges holistically. That is, for a set of N ROIs, a graph representation can be generated with N(N-1) candidate edges (described in greater detail below). Because in some embodiments of the present principles, graph relationships are essentially structural in nature rather than linguistic or semantic, the relative pose and dimensions of the observed objects can be used as initial features for the candidate edges.

In the system 100 for efficient visual navigation of FIG. 1, the pre-processing module 110 can receive inputs from, for example, either the optional ROI module 140 or at least one of an RGB camera 102 for providing RGB image data, a Lidar sensor 104 for providing depth information of captured images, and a semantic sensor 105 for producing semantic segmentation of, for example, an input RGB image. The pre-processing module 110 determines image information from the received data such as features of the images and 3D object positions of the images and semantic segmentation information of images, such as a class for each pixel in the RGB images. An objective of the present principles is to learn a policy through reinforcement learning that makes effective use of all three sensory inputs (RGB camera, Depth sensor, and the semantic sensor) for providing at least one of a navigation path in the navigation space, a model of the navigation space, and an explanation of a navigation action by an agent in a navigation space to be learned/traversed.

Figure 2:
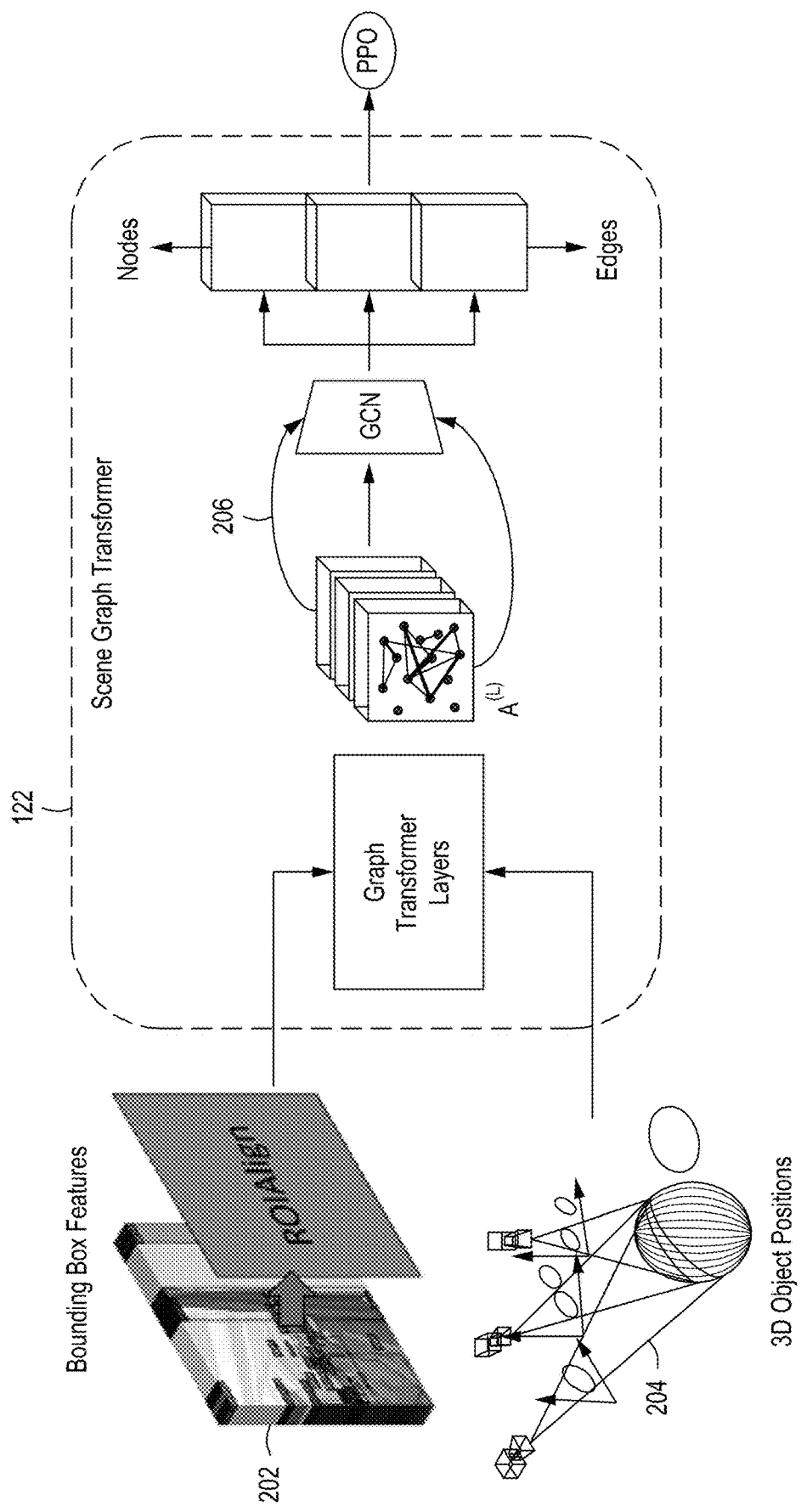
FIG. 2 depicts a high-level block diagram of a functional architecture of a graph representation module of the system of FIG. 1 in accordance with an embodiment of the present principles.

For example, in the system 100 for efficient visual navigation of FIG. 1, the graph representation module 120 can determine an intermediate representation of each scene of received, captured content for use in improving the understating of a navigation space for providing at least one of a navigation path in the navigation space, a model of the navigation space, and an explanation of a navigation action by the a mobile agent in the navigation space (described in greater detail below). For example, FIG. 2 depicts a high-level block diagram of a functional architecture of a graph representation module 120 of the system of FIG. 1 in accordance with an embodiment of the present principles. As depicted in FIG. 1, in some embodiments the graph representation module 120 can include a Scene graph transformer module/network 122. In the embodiment of FIG. 2, bounding boxes (e.g., ROI) can be determined, for example by the ROI module 140 and features (e.g., semantic features) of each bounding box (e.g., ROI) can be determined by the pre-processing module 110. The bounding box features can then be communicated to the Scene graph transformer module/network 122. Given semantic features 202 of a bounding box of scenes of received content captured by, for example one of the input sensors depicted in FIG. 1, and respective 3D object position information 204 from, for example depth information of a captured scene, the Scene graph transformer module/network 122 can determine a scene graph representation of captured scenes, which include node and edge level features.

That is, in some embodiments the Scene graph transformer module/network 122 can determine a scene graph of each scene. Scene graph representations serve as a powerful way of representing image content in a simple graph structure. A scene graph consists of a heterogeneous graph in which the nodes represent objects or regions in an image and the edges represent relationships between those objects. In some embodiments, the Scene graph transformer module/network 122 can include a novel Transformer architecture, The Transformer architecture of the present principles encourages the learning of pertinent objects/semantic features and/or regions of content, in some embodiments, via an attention mechanism. In some embodiments of the present principles, an attention mechanism of the Transformer architecture of the Scene graph transformer module/network 122 can encourage the learning of pertinent objects/semantic features and/or regions of content based on a spatial relationship of the content with the agent.

In some embodiments of the present principles, a Scene Graph Transformer module of the present principles, such as the Scene graph transformer module/network 122 of FIG. 2, implements a multi-layer architecture. For example, in the Scene graph transformer module/network 122 of FIG. 2, each Graph Transformer Layer softly selects adjacency matrices (edge types) from the set of adjacency matrices of a heterogeneous graph and learns a new meta-path graph, represented by $A^{(1)}$ in FIG. 2, via a matrix multiplication of two selected adjacency matrices. In some embodiments, the soft adjacency matrix selection can be a weighted sum of candidate adjacency matrices obtained by 1×1 convolution with non-negative weights from softmax. Such determined Scene graphs can be applied to guide image synthesis. Similarly, graph neural networks (GNN), of which graph convolutional networks (GCN) seem to be the most popular type, are a class of neural networks that enable the processing of graph-structured data in a deep learning framework in accordance with the present principles.

In some embodiments, such networks work by learning a representation for the nodes and edges in the graph and iteratively refining the representation via "message passing;" i.e., sharing representations between neighboring nodes in the graph, conditioned on the graph structure. In the embodiment of FIG. 2, a GCN 206 is implemented. To enable end-to-end graph generation and graph feature learning, in some embodiments, the GCN 206 builds up complex edges, by forming "meta-paths" from an initial set of simple geometric edge relationships. The Scene Graph Transformer module 122 learns to classify nodes and edges, while performing feature message passing using lightweight GCN operations.

For example, in some embodiments depth information from a depth image received from, for example, a Lidar sensor, can be used by, for example, the Scene graph transformer module/network 122 to estimate both the dimensions of each object, as well as the approximate location of the object. The two 6-dimensional vectors (3 dimensions and 3 coordinates) can be concatenated for each pair of nodes as the input edge representation. In the Scene graph transformer module/network 122, the GCN 206 can be implemented to simultaneously extract meaningful edges from the fully-connected graph and to perform message passing across heterogeneous edge types.

For example, an input to the GCN 206 can be a complete graph $G=(V, E)$ on the set of nodes, V nodes. That is, if $N=|V|$ denote the number of nodes, then $E=\{(i,j)|\forall i,j \in V\}$ and $|E|=N(N-1)$. Each $v \in V$ is represented by a vector $z \in \mathbb{R}^{d_V}$, where $d_V$ is the output dimension of the CNN used to process the node ROIs. Each $e \in E$ is represented by a vector $a \in \mathbb{R}^{d_E}$, where $d_E$ is the number of input edge features defined above; i.e., $d_E=6$. The structure of the input graph can then be compactly represented as the tensor $A \in \mathbb{R}^{N \times N \times d_E}$. After several layers of processing, the output of this network is a set of N labels, one for each node in the original graph, and a new, sparse adjacency matrix $A_S \in \{0,1\}^{N \times N}$. In some experiments, three (3) layers are used for both the adjacency matrix learning and for node-node message passing in the GCN 206.

In embodiments of the present principles, the generation of a new set of paths is performed by a sequence of layers, each of which uses soft attention mechanisms to select candidate graph structures complete adjacency matrix, A. The layer outputs a new multi-hop adjacency matrix as the composition of the soft-selected candidate graph structures. The layer computes a transformation of the complete adjacency matrix, A, using a 1×1 convolution with the softmax of two sets of learned weights, $W_1, W_2 \in \mathbb{R}^{1 \times 1 \times d_E}$ (where W1 and W2 parameterize the convolution operation). In some embodiments, a number of such layers can be stacked to generate arbitrary length, l, paths with adjacency matrix, $A_P$, according to equation one (1), which follows:

$$A_P = (\Sigma_{t_1 \in \varepsilon^e} \alpha_{t_1}^1 A_{t_1})(\Sigma_{t_2 \in \Sigma_\tau^e} \alpha_{t_2}^2 A_{t_2}) \ldots (\Sigma_{t_l \in \varepsilon^e} \alpha_{t_l}^l A_{t_l}). \quad (1)$$

To ensure the network is able to learn meta-paths that are of any length and that can also include some of the original graph edges, the identity matrix is always included, i.e., $A_0=I$.

In some embodiments of the present principles, following a sequence of layers, the GCN 206 is used to learn useful representations for node representations in an end-to-end fashion. With H(l), the node features at the lth layer in the GCN 206, the message passing operation is performed according to equation two (2), which follows:

$$H^{l+1} = \sigma\left(\tilde{D}^{-\frac{1}{2}}\tilde{A}\tilde{D}^{-\frac{1}{2}}H^l W^l\right), \quad (2)$$

where $\tilde{A}=A+I \in \mathbb{R}^{N \times N}$ represents A with added self-loops, $\tilde{D}$ is the degree matrix of $\tilde{A}$ (where $D_{ii}$ represents the degree of node i and $W^l \in \mathbb{R}^{d \times d}$ is a learned parameter matrix for layer l). In standard GCN, only the node-wise linear transform H(l)W(l) is learnable. However, the preceding layers output several update (meta-path) adjacency matrices at each iteration, allowing the entire graph structure to be learned. If the number of output channels of the 1×1 convolution in each layer is C, then each layer outputs a pair of intermediate adjacency tensors $Q_1$ and $Q_2 \in \mathbb{R}^{N \times N \times C}$. In some embodiments, the described architecture functions as an ensemble of GCNs operating on each of C adjacency matrices output by the final Graph Transformer layer. In some embodiments, a GCN is applied to each channel, C, and the multiple node representations are concatenated to form a holistic node representation $Z \in \mathbb{R}^{N \times C \cdot d}$, where d is the node feature dimension.

In some embodiments, the output adjacency tensor, $Q_1 \otimes Q_2 = \hat{A} \in \mathbb{R}^{N \times N \times C}$ is preserved as a C-dimensional feature vector for each edge. In some embodiments, two separate fully-connected heads are then utilized. The first predicts a class for each node given Z, using standard cross-entropy given the objects present in the scene as supervision. The other outputs zero or more types for each edge given $\hat{A}$, using multi-label binary cross-entropy given the edge types extracted from the renderer as supervision. In some embodiments, the whole architecture also receives feedback from gradients propagated from the reward signal of a Deep Reinforcement Learning (DRL) or an imitation Learning (IL) policy learning algorithm. For example, DRL models directly learn a mapping from observations to actions through trial-and-error interactions with its environment and IL models learn by imitating a supervisor, which can provide data demonstrating the desired behavior.

During navigation, an agent (e.g., robot, machine, etc.) constructs and accumulates a scene graph representation in accordance with the present principles for a perceived environment for more effective decision-making as described above. In some embodiments, data/information from determined intermediate representations, in this embodiment scene graphs, can be implemented by a machine learning process to determine a model of an environment(s) for which content was captured by, for example, sensors, such as the RGB 102, Lidar 104, and semantic sensor 105 of the embodiment of FIG. 1. In some embodiments, the model(s) determined for the environment(s) can then be used by an agent along with an inference module of a machine learning process to navigate unknown environments by applying the determined scene graph information from previously captured scene features to previously unseen scene features. It should be noted that a scene graph representation of the present principles also supports novel downstream applications, such as providing a navigation path in the navigation space, providing a model of the navigation space, and providing an explanation or reasoning of an agent's behaviors and/or actions.

An example will now be described of the construction and application of a scene graph representation in accordance with an embodiment of the present principles. Although the example will be described with respect to a PointGoal and VLN as target tasks, a scene graph representation in accordance with the present principles can be applied for any navigation task, such as ObjectGoal, AreaGoal, or Exploration, that requires an agent to move throughout an environment. In the following example, Success weighted by Path Length (SPL) and Success Rate (SR) are used as the primary metrics to evaluate the navigation performance of agents. Normalized Dynamic Time Warping (NDTW) and Navigation Error (NE) are reported for VLN agents.

PointGoal navigation requires an agent to navigate to an assigned target position, given a starting location and orientation. In the example described below, the base network for performing PointGoal navigation is derived from the "RL+Res18" baseline. Namely, the ResNet18 visual encoder was replaced with a Scene Graph Transformer Network of the present principles as described above. In some embodiments, the features of each node are average pooled and passed through a fully-connected layer, and then input along with the agent's previous action and an encoding of the target to a one-layer gated recurrent units (GRU) to enable the agent to maintain coherent action sequences across several time steps, followed by a linear layer to predict the next action. In some embodiments, to increase the sample efficiency, the continuous representation of the agent's relative angle and distance to the target and the one-hot encoding of its previous action are replaced with a learned 32-dimensional embedding of the same.

In the example and as depicted above in FIG. 2, a model/network is trained end-to-end using a proximal policy optimization (PPO) 208, a first-order optimization that simplifies its implementation. All policies trained receive a reward, $R_t$, at time step t, proportional to the distance moved towards the goal. In some embodiments, an auxiliary coverage reward equal to the change in the percentage of the ground truth scene graph observed by the agent can also be included. This helps to encourage the agent to explore and seek better views to complete more of the scene graph.

To evaluate a process for generating a scene graph of the present principles on a downstream task, the above-described process of the present principles, referred to in the example as GraphMapper, is compared against two best-performing, end-to-end reinforcement learning (RL) methods (1) RL+GraphMapper: An RL policy that replaces the ResNet18 of "RL+Res18" with GraphMapper policy architecture, followed by a GRU: (2) RL+GraphMapper+ProjDepth: A baseline adapted from "RL+Res18+ProjDepth" that, in addition to replacing ResNet18 visual encoder with GraphMapper, also projects the depth to an egocentric top-down map as input to the RL policy. In the example the depth image is passed through a three-layer CNN before concatenating with an output of GraphMapper and passing to the GRU policy. For fair comparison an RGB-D only baseline is implemented that uses ResNet50. The results presented below evidence that a process for generating a Scene Graph in accordance with the present principles can perform as a modular component in any learning-based visual navigation system (e.g., Active Neural SLAM).

Figure 3:
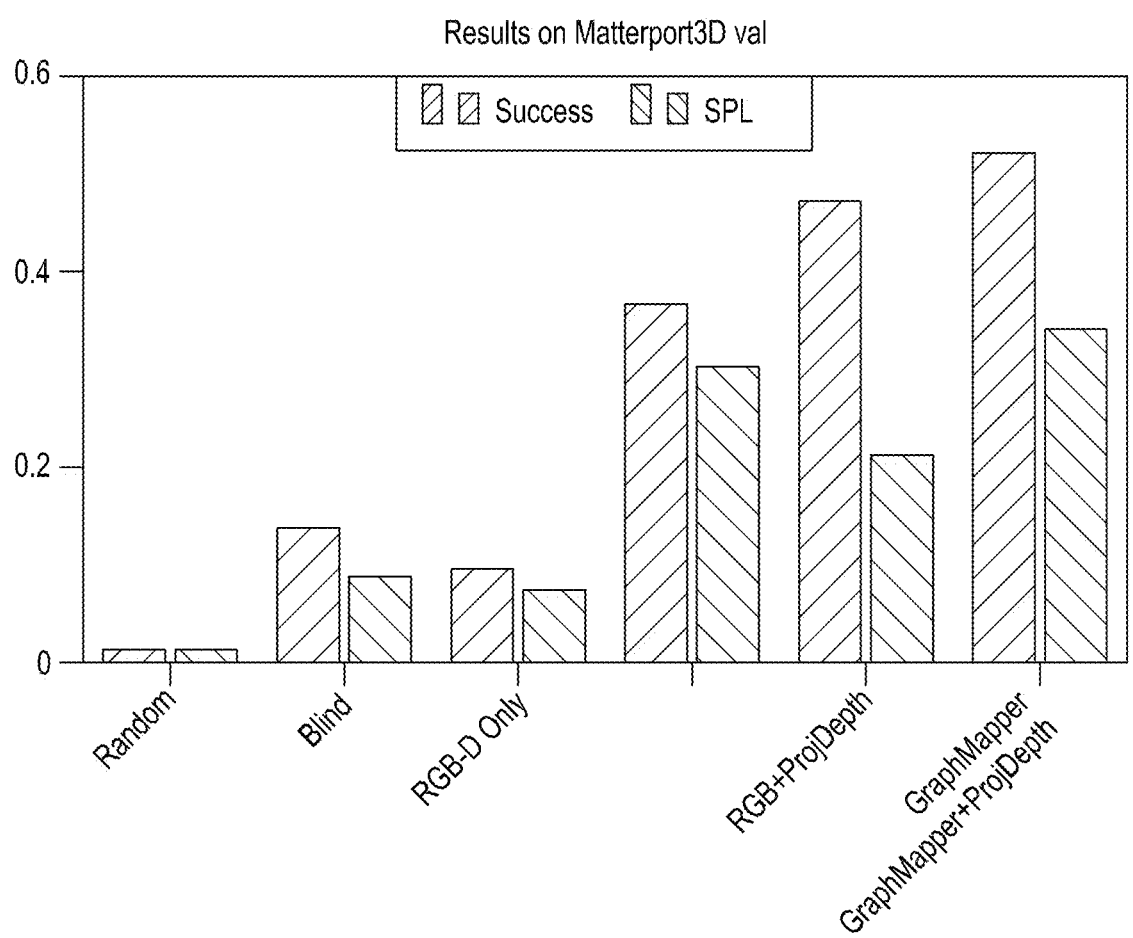
FIG. 3 depicts a table of the results of several Reinforcement Learning (RL) models with and without an embodiment of a GraphMapper of the present principles.

FIG. 3 depicts a table of the results of several Reinforcement Learning (RL) models with and without an embodiment of a GraphMapper of the present principles. In FIG. 3, in addition to the Random (unlearned) and Blind (no visual observation) baselines, the performance of two visual navigation policies without (RGB-D Only and RGB+ProjDepth) and with (GraphMapper and GraphMapper+ProjDepth) a Scene Graph Transformer Network of the present principles included in, for example, a visual encoder. In the embodiment of FIG. 3, the results were calculated on the Matterport3D validation split, which is a set of 495 navigation episodes not observed during training. In the example of FIG. 3, all agents were trained with an equal amount of experience, 14 million steps on the Matterport3D training split, which has been shown to be sufficient experience for learning-based models to outperform traditional simultaneous localization and mapping (SLAM) systems.

As depicted in FIG. 3, with the above-described amount of training, the ResNet50 model underperforms compared to the blind agent. It is clear from the table of FIG. 3, however that the addition of the GraphMapper of the present principles leads to more efficient training, by comparing agents trained with an equal amount of experience, also leading to significant performance improvements on the given training budget.

As depicted in FIG. 3, the RGB+ProjDepth RL model, which supplements visual observation with an accumulated, top-down egocentric map of the environment, performs well, particularly in terms of SPL. However, as depicted in FIG. 3, replacing the standalone ResNet50 visual encoder of the RGB+ProjDepth RL model with a GraphMapper of the present principles, yields even greater improvements. It should be noted that the Scene Graph Transformer Network of the present principles is better able to refine visual features with semantic-structural priors to increase the sample efficiency of the network, nearly doubling the SPL with the same amount of training experience.

As further depicted in FIG. 3, the GraphMapper+ProjDepth RL model yields the best results, as structurally-refined visual features and egocentric map features are more closely aligned in encoding the agent's local 3D space, such that the policy can take effective advantage of each.

Figure 4:
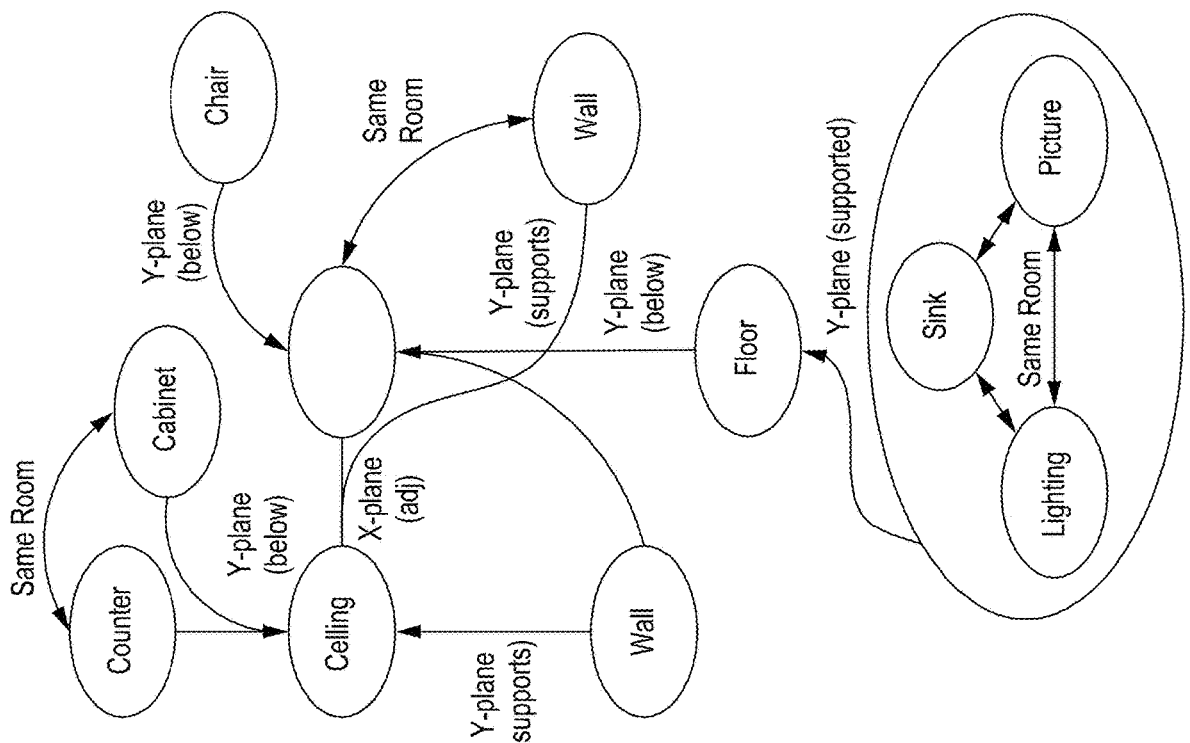
FIG. 4 depicts an example of a scene observed by the agent and a scene graph generated by a GraphMapper/Scene Graph Transformer Network of the present principles.
Figure 4:
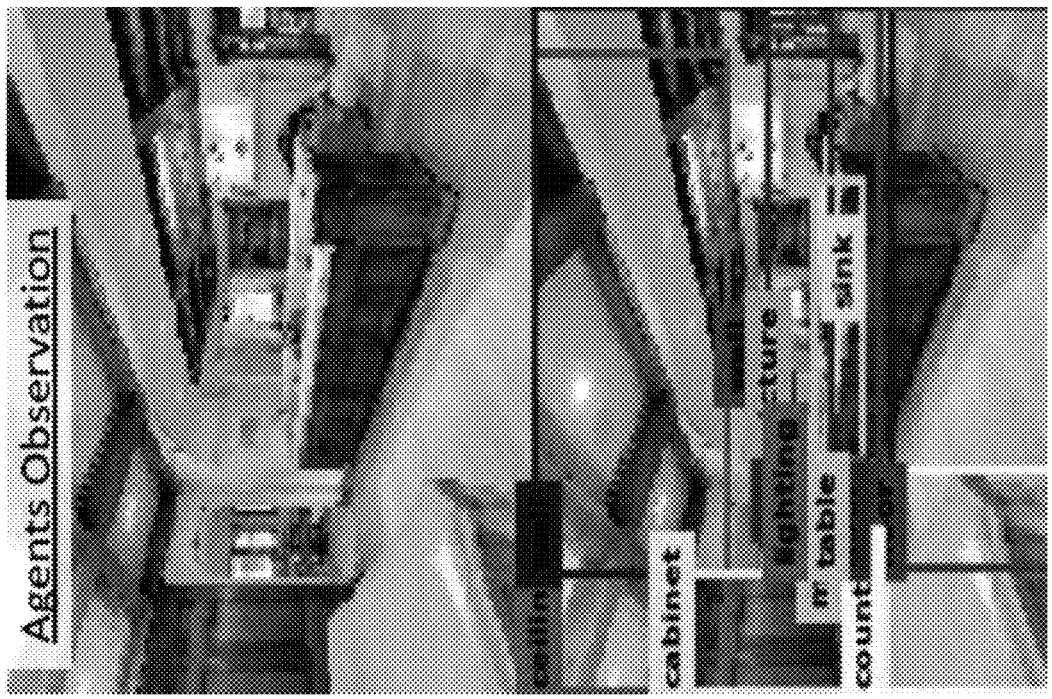

As previously described above, in addition to effectively learning visual navigation policies, a GraphMapper/Scene Graph Transformer module/network 122 of the present principles also enables the generation of scene graphs of the environment. For example, FIG. 4 depicts an example of a scene observed by the agent and a scene graph generated by a GraphMapper/Scene Graph Transformer module/Network 122 of the present principles. In FIG. 4, for each node classified with high confidence (p>0:5), a bounding box can be provided. On the right side of FIG. 4 are depicted the same nodes as part of the heterogeneous scene graph with a subset of the most confident evidence, chosen by high attention scores (top 10%) from the meta-path selection in the Scene Graph Transformer Network. In FIG. 4, each edge is labeled with its predicted category (either "same room" or sharing one of the x;y; or z planes) as well as, where appropriate, a potential semantic explanation of the relationship. For example, objects that are relatively co-planar both horizontally and vertically can be said to share a "supporting-supported by" relationship. Furthermore, in some embodiments, by accumulating these graphs over an entire navigation trajectory, embodiments of the present principles can be utilized for richer downstream tasks, such as mapping the environment into discrete semantic spaces.

Referring back to FIG. 1, alternatively or in addition the graph representation module 120 of the system 100 of FIG. 1 can determine a Semantic map as an intermediate representation of received, captured scenes. That is, in some embodiments the graph representation module 120 can include an egocentric semantic map module/network 124. In the egocentric semantic map module/network, a semantic map of a navigation environment/space can be constructed and maintained using received depth and semantic information of captured scenes. In some embodiments, an image of the map is constructed such that the agent is at the center, and the map is rotated such that the agent's heading points upwards. The proposition of the present principles is that enhancing the map with a structured semantic representation of the objects and regions in a scene will enable an agent to make better decisions with regards to providing at least one of a navigation path in the navigation space, a model of the navigation space, and an explanation of a navigation action by an agent in a navigation space to be learned/traversed, in addition to exploring unseen areas.

In some embodiments for map construction, it is assumed that no estimation error exists on the agent's pose. Concisely, when an agent takes an action at time step, t, it receives a set of observations $O_{t+1}=(r_{t+1}, d_{t+1}, s_{t+1})$ representing the outputs from available RGB, Depth, and semantic sensors, respectively. The pixels in the depth image can be back-projected to a 3-D point cloud using the known camera intrinsic parameters. The extrinsic parameters can then be calculated from the agent's current pose estimate to transform a point cloud from a camera/sensor's reference frame to the world frame. In some embodiments, the points are then projected down to form a 2-D map of the environment.

In some embodiments, the map is cropped to a fixed radius, r, around the agent such that the agent is at the center, of the image and is rotated such that the agent's heading points upwards. It is proposed that discriminating different objects and free space is useful for long-term decision making and reward prediction, particularly in large environments where an agent must traverse several rooms to achieve its goal. As such, in some embodiments, an approach includes enhancing the information stored in the agent's map of the environment with the semantic classes of perceived features/objects and components in the scene. That is, in some embodiments for each point categorized as an obstacle, a respective semantic class (e.g., the highest prediction class conditional probability of the pixel from semantic segmentation or value given from the semantic sensor) can be stored directly in the map. When there are instances of vertically overlapping objects (e.g., lamp hanging over a table) or if the map resolution is low, some points can be projected down into the same map location, resulting in a loss of information where one class overwrites others. As such, in accordance with the present principles, each location in a 2r×2r map, M, is treated as a binary vector, $M_{ij} \in \{0, 1\}_c^N$, where, k=1 if class k is present at that location and 0 otherwise. In this way, as an agent moves through the environment, the agent accumulates a map containing a bag-of-classes at each grid location. In addition to providing a richer source of information about the environment, the semantically enhanced map of the present principles enables the same policy architecture to translate easily to other navigation tasks (e.g., ObjectGoal) where the agent must identify semantics of its surroundings for successful goal achievement.

FIGS. 5A-5F depict examples of visualizations of the various observation modalities available to the agents in a navigation environment. FIG. 5A depicts an RGB image captured by, for example, the RGB camera 102 of FIG. 1; FIG. 5B depicts a Depth image colorized with Turbo captured by, for example, the Lidar sensor 104 of FIG. 1; FIG. 5C depicts a semantic segmentation mask of the RGB image; FIG. 5D depicts an occupancy map, where green denotes traversable space and blue denotes obstacles; FIG. 5E depicts a semantic map; and FIG. 5F depicts a ground truth map of a path traversed by the agent.

Figure 6:
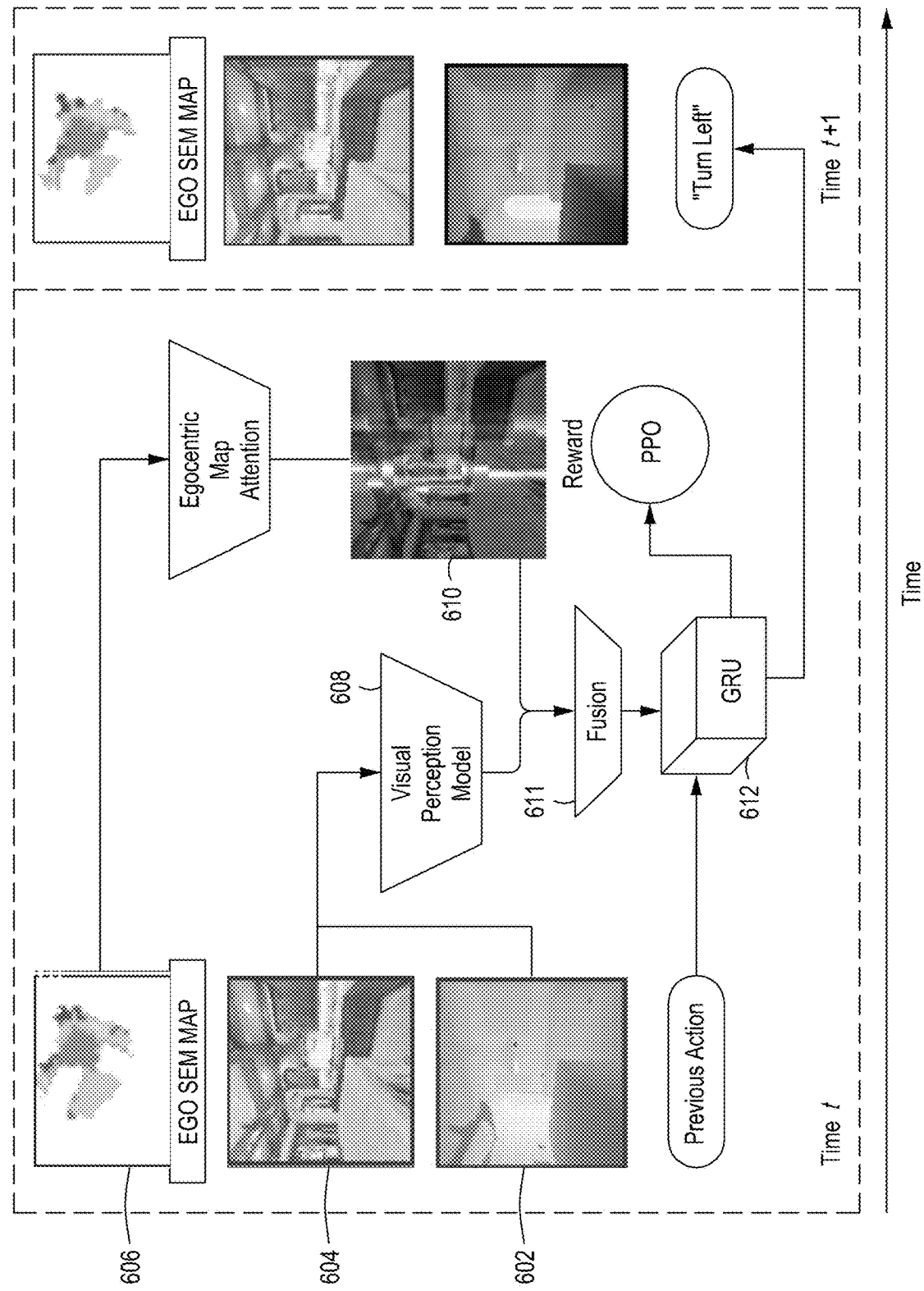
FIG. 6 depicts a functional block diagram of a policy architecture of a Semantic map building network in accordance with an embodiment of the present principles.

FIG. 6 depicts a functional block diagram of a policy architecture of an embodiment of the egocentric semantic map module/network 124 of the present principles. In the embodiment of FIG. 6, the egocentric semantic map module/network 124 receives two sources of information, an RGB-D observation 602 and an image 604, such as an RGB image. A 2-D egocentric semantic map 606 can be determined from the image 604. In some embodiments (not depicted in FIG. 6) a bounding box can be applied to the egocentric semantic map 606 by, for example, the ROI module 140 of FIG. 1, to provide a region of interest for the egocentric semantic map 606. In the embodiment of FIG. 6, each of the sources of information are processed by a convolutional neural network (CNN) in, for example the pre-processing module 110 of FIG. 1, to produce visual 608 and map feature vectors 610, respectively.

The RGB and Depth observations at time step t can be denoted by $(r_t, d_t)$. The visual model 608 of FIG. 6, which can be denoted as $f_{CNN}$, transforms $(r_t, d_t)$ to $(r_t^{emb}, d_t^{emb})$ by $f_{CNN}(r_t)$, $f_{CNN}(d_t)$. In some embodiments, both RGB and Depth observations are concatenated and are transformed by $f_{CNN}$, with the corresponding output being obtained as $rd_t^{emb}$. In some embodiments, for brevity and without loss of generality, the output can be obtained as $r_t^{emb}$.

In the embodiment of FIG. 6, the egocentric semantic map module/network 124 of the present principles that transforms the egocentric semantic map at time step t, $M_t$, is represented by $f_{MAP}$. In a first embodiment, $f_{MAP}$ processes the map input by treating the map like a memory unit. In such embodiments, the geometry and layout of a respective scene is explicitly preserved and such information is "read" (or extract feature) from "the memory". A form of Transformer architecture adapted to use both a two-dimensional self-attention mechanism and to learn specialized positional embeddings is utilized to better take advantage of the structured nature of the map input. That is, in some embodiments, the egocentric semantic map module/network 124 can include a novel Transformer architecture. The Transformer architecture of the present principles encourages the learning of pertinent objects/semantic features and/or regions of content, in some embodiments, via an attention mechanism. In some embodiments of the present principles, an attention mechanism of the egocentric semantic map module/network 124 can encourage the learning of pertinent objects/semantic features and/or regions of content based on a spatial relationship of the content with the agent. Such utilization enables the egocentric semantic map module/network 124 of the present principles to better learn a representation of semantic classes present in the scene and to extract information about the relevant regions of the map.

In accordance with embodiments of the present principles, because the input to $f_{MAP}$ consists of an $2r \times 2r \times N_c$ map centered on the agent, each map cell contains important structural information. That is, it is important to encode information about a cell based on its current relationship to the agent. As such in some embodiments of the present principles, for a map of radius r, a $2r \times 2r$ matrix of position indices, $\mathcal{P}$, using a Gaussian kernel, centered on the agent, with a scale factor of $$\frac{r}{2}.$$

As more of the mass of the Gaussian kernel is concentrated around the center, this has the benefit of giving fine-grained positional representations to map cells nearer the agent than those farther away.

Figure 7:
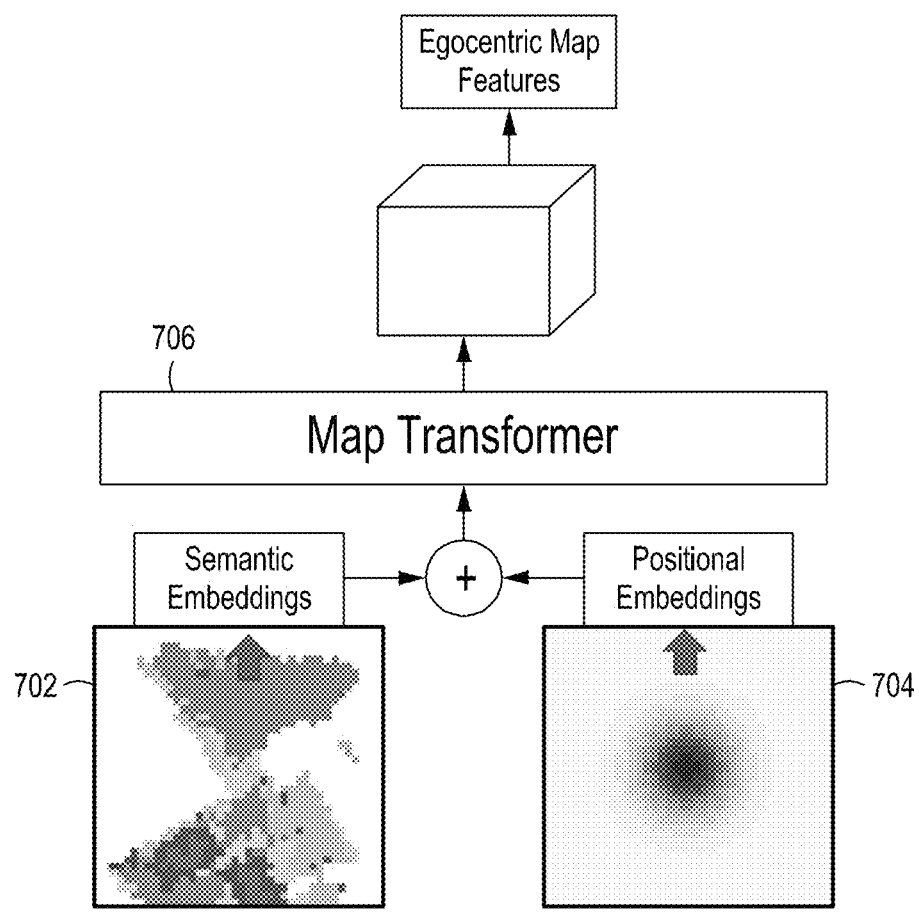
FIG. 7 depicts a block diagram of a multi-layer map Transformer in accordance with an embodiment of the present principles.

Given such a kernel matrix, in some embodiments position indices, $\mathcal{P}$, are constructed by assigning each unique value in the kernel a unique consecutive integer, which are then used to index learned positional embeddings. Thus, a sum of the embeddings and the bag-of-embeddings for the semantic classes at each cell are used as the input to a multi-layer Transformer of the present principles. That is, in some embodiments of the present principles, an egocentric semantic map module/network of the present principles, such as the egocentric semantic map module/network 124 of FIG. 1, implements a multi-layer architecture. For example, FIG. 7 depicts a block diagram of a multi-layer map Transformer of the present principles that, in some embodiments can be implemented by the egocentric semantic map module/network 124 of the graph representation module 120 of the system 100 of FIG. 1. As depicted in the embodiment of FIG. 7, semantic information of an image from, for example, an input semantic map 702 (color-coded by class), is combined with encoded positional indices 704 (with colors becoming darker closer to the agent) in a Map Transformer 706 of the present principles to determine egocentric map features for an egocentric map 606 of the present principles.

In some embodiments, each layer of the Map Transformer 706 is adapted to utilize 1×1 convolutions to preserve the spatial dimensions of the map before pooling across both spatial dimensions and the final output. The final transformed feature representation, $f_{MAP}(M_t)$, is denoted as $M_t^{emb}$, with both $r_t^{emb}$, $M_t^{emb} \in \mathbb{R}^{N_h}$ and $N_h$ is the hidden dimension of the policy network.

Referring back to FIG. 6, the pooled outputs of $f_{CNN}$ and $f_{MAP}$ are finally concatenated and fused 611 by, for example, a fully-connected layer. The output along with the agent's previous action is fed into a one-layer gated recurrent unit (GRU) 612, that enables the agent to maintain coherent action sequences across several time steps (the actor) followed by a linear layer (the critic) to predict the next action.

In some embodiments of the present principles, the egocentric semantic map module/network 124 of the present principles can be trained end-to-end using reinforcement learning, particularly proximal policy optimization (PPO) 614. In such embodiments, policies trained in this manner receive a reward, $R_t$, at time step, t, for moving closer to the goal of an agent equal to the change in distance to the goal plus a large reward, s, if the goal is reached and a small-time penalty, $\lambda$. For agents with access to a map of the environment, an auxiliary reward equal to the percentage of map tiles that have been revealed are also added to encourage both exploration and better use of the map features. In some embodiments, trained policies can also include a small penalty for collisions with environment, equal to $0.01\lambda$.

In one example, a Habitat simulator can be used, which supports Matterport3D, which consists of 3D reconstructions of 90 houses with a total of 2056 rooms, as it exhibits the greatest episodic complexity compared to other datasets. In one embodiment, standard splits are used and it should be noted that there is no overlap of scenes in the Matterport3D splits. Typically, a navigation episode is registered as a success if (i) the agent has taken fewer than 500 steps, (ii) the distance between the agent and goal is less than 0.2 m, and (iii) the agent takes STOP action to indicate that it has reached goal. The third condition eliminates a situation when the agent randomly stumbles upon the target and receives reward.

In the example, success weighted by path length (SPL) is reported. SPL is a measure of the efficacy of the policy's path taken to the goal compared against the ground truth shortest path. The networks are implemented using PyTorch and the habitat-sim and habitat-api modules, which are modular high-level libraries for end-to-end training/development of models for embodied AI tasks, such as navigation. For training, a rollout size of 256, a hidden dimension of 512, and a learning rate of 10−4 was used. A 2-layer BERT model with 4 attention heads each and embeddings of size 128 were used for both positional and semantic embeddings. In the example, the agents were equipped with an idealized GPS sensor and compass. Following the use of ground truth scene information (such as ground truth depth), the known depth and label of each pixel from the simulation environment was used to enable a fair comparison.

FIG. 8 depicts a table comparing an egocentric semantic map module/network 124 of the present principles, referred to in the example as MaAST, with several baselines on the MatterPort3D validation set. In the example associated with FIG. 8, the agents are trained end-to-end using DRL, namely PPO, with the above-described reward mechanism. The performance of RL-based agents are evaluated with different input sensor modalities: RGB-D, with only RGB and Depth sensors as inputs; RGBD+OCC (i.e., along with RGB-D input, the method also uses an egocentric occupancy map), trained with both goal and exploration rewards. In the embodiment associated with FIG. 8, the policy architecture is trained by PPO end-to-end for PointGoal navigation. In the example associated with FIG. 8, all the methods are evaluated under a fixed training budget of 14 million steps of experience.

The table of FIG. 8 demonstrates that the MaAST approach of the present principles significantly outperforms other methods and baselines, under a much, reduced computational load. As depicted in FIG. 8, among agents equipped with visual sensors, agents equipped with MaAST show significant improvement over other agents. That is, the improvement of agents implementing MaAST is +13% absolute (+38% relative) in SPL as compared to RGB-D alone and +4% absolute (+9% relative) as compared to RGBD+OCC. In terms of success rate, the performance increase of agents implementing MaAST is comparatively less, +6% relative over RGB-D and +4% relative over RGBD+OCC. Table 1 demonstrates that even though most of the methods succeed at nearly the same rate, MaAST's policy demonstrates superior efficacy in producing shorter paths to the target, due at least in part to the ability provided by the attention mechanism of the present principles to focus on more relevant parts of the map, such as potential collisions or new areas to explore. In the example of FIG. 8, the performance of MaAST was averaged over 5 random seeds and obtained SPL of 47.5±0.7, making the performance gain over other compared methods roughly an order of magnitude greater than the standard deviation of MaAST's performance. Furthermore, it is noted that MaAST is able to achieve significant improvements over SLAM in only 14 million training steps, which could not be achieved by RGB-D alone in prior work, even with five times more experience.

Referring back to FIG. 1, in some embodiments of the present principles, a system for efficient visual navigation of the present principles, such as the system 100 for efficient visual navigation of FIG. 1, can enable an agent to learn/ navigate a navigation space using received language instructions. For example, in some embodiments, the system 100 for efficient visual navigation of FIG. 1 can receive language navigation instructions from a user/navigation device via, for example, an input device (not shown) of the computing device 1300. For example, a Vision-Language navigation task requires the agent to navigate in a 3D environment to a target location following language instructions. Embodiments of the present principles combine classical mapping techniques with a learning based method and train a hybrid transformer-recurrence model to equip an agent with the ability to at least 1) establish a temporal memory by generating a local semantic map from a first person visual observations (RGB and Depth), 2) create a spatial relationship between visual and linguistic modalities, thus identifying relevant areas in the visual observations corresponding to the provided instructions, and 3) preserve the relevant temporal states information over time using a transformer-inspired attentive model, thus making the agent spatially and temporally aware of its environment.

Embodiments of the present principles focus on utilizing generated intermediate representations of each scene, such as the determined scene graph representations and semantic map representations described above, in an attentive transformer-like architecture to focus on and extract cross-modal features between a local map and provided instructions for Vision and Language Navigation. In the vision language navigation module 130 of the system 100 of FIG. 1, the goal of the SLAM-T module 132 is to cooperate with the graph representation module 120 of the system 100 of FIG. 1 to generate an intermediate representation over time and identify a matching between provided verbal instructions and an intermediate representation, in the following description, a Semantic Map, using cross attention. The Hybrid Action Decoder 136 of the navigation module 130 of FIG. 1 then utilizes cross attention features obtained from both RGBD-Linguistic module 134 and the Semantic Map-Linguistic module 132 of the navigation module 130 of FIG. 1 to select an action at each time-step.

Figure 9:
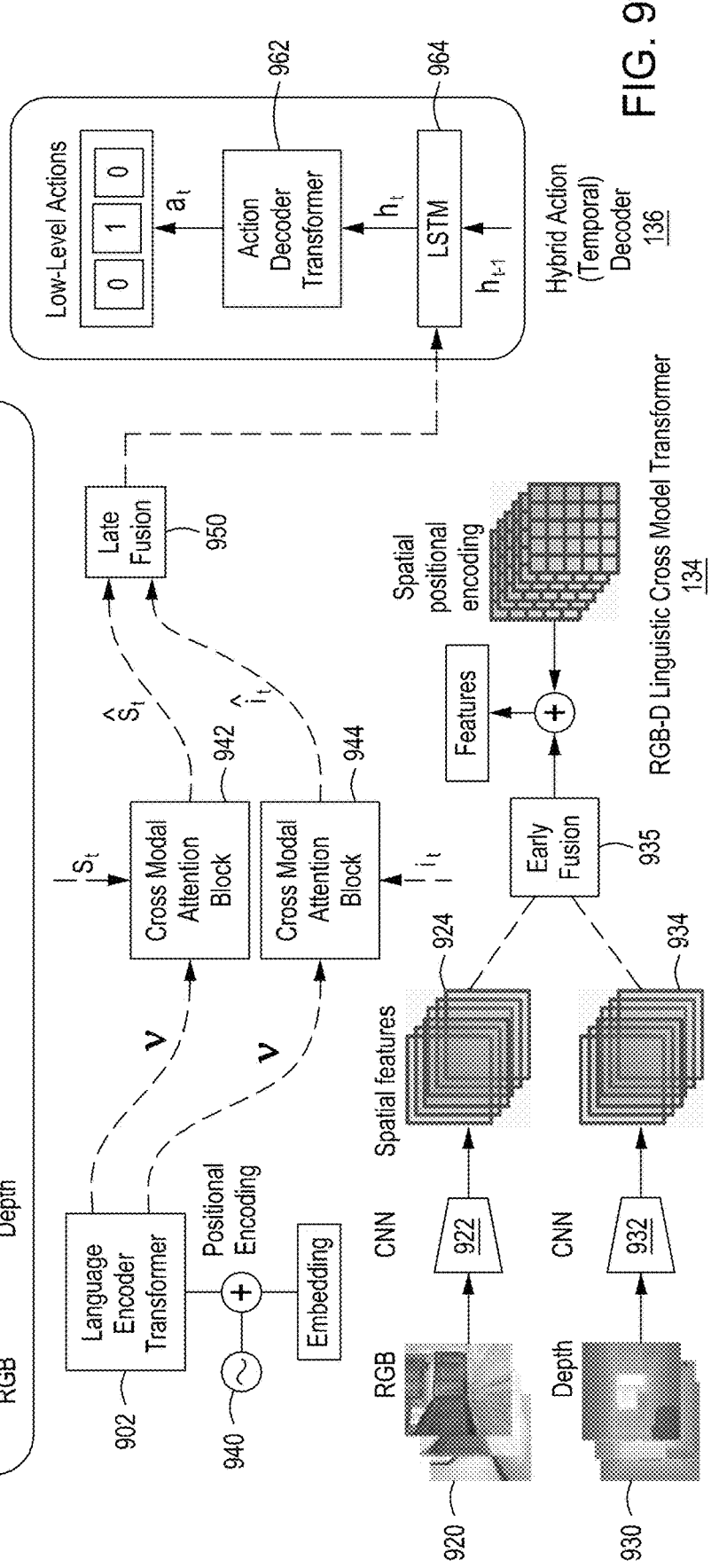
FIG. 9 depicts a functional block diagram of the operation of the vision language navigation module in accordance with an embodiment of the present principles.

FIG. 9 depicts a functional block diagram of the operation of the system 100 for efficient visual navigation of FIG. 1, including the vision language navigation module 130, for performing a vision-language navigation task in accordance with an embodiment of the present principles. In the embodiment of FIG. 9, the Semantic-Linguistic Attention Map Transformer (SLAM-T) module 132 and the RGBD-Linguistic Transformer module 134 of the vision language navigation module 130 consistently reason between visual and textual spatial domains. The Hybrid Action Decoder module 136 of the vision language navigation module 130 captures the temporal dependencies inherent in following a trajectory over time.

For example, in the embodiment of FIG. 9 and as at least partially described in a previous embodiment above, to generate a semantic map from visual observations, a classical three step approach can be applied by a cooperation of the graph representation module 120 and the SLAM-T module 132, in which $r_t$, $d_t$ and $s_t$ denote the RGB images 902 and depth-related images 904. As depicted in FIG. 9, in some embodiments of the present principles, semantic features 906 can be determined from the RGB images 902 using a neural network, such as an RCNN 907 depicted in FIG. 9. In some embodiments, the depth observations, $d_t$, is first projected to a 3D point cloud 908, $P_c$, using camera intrinsic parameters. An agent's current pose estimate, $p_t$, is used to find camera extrinsic parameters, $X_c$, to transform the 3D point cloud 908 to the world frame, W. The obtained transformation, $P_w$, is projected to a 2D space and stored as either obstacles, $o_p$, based on a height threshold, $h_l$, $h_h$, or free space, $f_p$. For each point categorized as an obstacle, $o_p$, the semantic class (i.e., the value given by the semantic sensor, $s_t$), is stored. As such, each location is treated in a 2r×2r map, $S_t$, as a binary vector, $S_{t_{xy}} \in \{0, 1\}$, where index k=1 if class k is present at that location and 0 otherwise.

In the embodiment of FIG. 9, to cross modally attend to the relevant areas of the provided instructions, $q_t$, and the generated semantic map, $S_t$, the instructions, $q_t$, are first encoded in a fully attentive model. That is, given a natural language instruction comprising of k words, its representation can be denoted as $\{q_1, q_2, \ldots, q_k\}$, where $q_i$ is the embedding vector for the $i_{th}$ word in the sentence. In the embodiment of FIG. 9, the instructions are encoded as $TRM(q_t+PE(q_t))$ to get the instruction encoding vector, $v_t$, where PE denotes the fixed sinusoidal positional encoding used to encode the relative positions of words appearing in the sentence.

In the embodiment of FIG. 9, the SLAM-T module 132 can include a stacked multi-head attention block (M.H.A) (not shown) followed by a position wise feed forward block (not shown). In some embodiments, individual transformer (TRM) blocks can be computed according to equation three (3), which follows:

$$M.H.A(Q, K, V) = concat(h_1, \ldots, h_k)W^h \quad (3)$$

$$\text{where } h_i = attend(QW_i^Q, KW_i^K, VW_i^V)$$

$$attend(Q, K, V) = softmax\left(\frac{QK^T}{\sqrt{d_k}}\right)V.$$

A basic attention block uses a linear projection of the input to find queries, $(Q_q=q+PE(q))$, and keys, $(K_q=q+PE(q))$. Based on the similarity between queries, $Q_q$, and keys, $K_q$, a weighted sum over the values $(V=q+PE(q))$ is computed as the output attention (A). It should be noted that in the embodiment of FIG. 9, the language encoder transformer uses the same language sequences to project the tuple, $Q_q$; $K_q$; $V_q$, and hence the attention output is referred to as self-attention. $W_i^Q$, $W_i^K$, $W_i^V$, and $W^h$ are parameters to be learned.

The output representation of a semantic map 909, $S_t$, is a 2r×2r map centered on the agent. The map representation, $S_t$, is referred to herein as a Bag of Semantic Indices (BoSI) 910. Each cell in the map, $S_{t_{xy}}$, carries important structural information about the map. In some embodiments, to encode the map features in a fully attentive transformer model (Equation 3), for example, the SLAM-T module 132 can construct a 2r×2r relative positional encoding matrix, $\mathcal{P}$, such as a circular positional encoding 911, using a Gaussian kernel, centered on the agent, with a scale factor of $$\frac{r}{2}.$$

Gaussian positional encoding (GPE) is computed after projecting the Gaussian kernel into an embedding space according to equation four (4) as follows:

$$GPE = embed_{2D}(F(x, y)) \quad (4)$$

$$F(x, y) = \frac{b^2}{\sqrt{2\pi\omega^2}} \exp\left(-\frac{(x-y)^2}{2\omega^2}\right),$$

where ω is the input scale parameter (equivalent to the standard deviation of the Gaussian) and b is the output scale parameter. In the embodiment of FIG. 9, the semantic map representation, $S_t$, is encoded in a 2-step process.

In a first step, self-attention is computed over the map representation, $S_t$, by implementing Equation (3). The sum of Bag of Semantic Indices (BoSI) 910 and Gaussian positional encoding, $\mathcal{P}$, are used as query, key and value, $Q_s=K_s=V_s=S_t+GPE(S_t))$ in Equation (3). A transformer feature representation, $\hat{S}_t^s \in \mathbb{R}^2$ using self-attention can be computed according to equation five (5) as follows:

$$\hat{S}_t^s = TRM(S_t+GPE(S_t)), \quad (5)$$

where $\hat{S}_t^s$ is an (r×r)×H matrix, where (r×r) is the 2D semantic map collapsed into one dimension and H is the hidden size.

In a second step, cross attention is performed between computed language features, $v_t$, and semantic map self-attention features, $\hat{S}_t^s$. Equation (3) is implemented by using $\hat{S}_t^s+GPE(\hat{S}_t^s)$ as Query and $v_t$ as Key and Value to get final cross attention features $\hat{S}_t^s \in \mathbb{R}^{(r \times r) \times H}$ according to equation six (6), as follows:

$$S_t = TRM(\hat{S}_t^s + GPE(\hat{S}_t^s), v_t). \quad (6)$$

In the embodiment of FIG. 9, given an initial observed image 920 ($r_t \in \mathbb{R}^{h_0 \times w_0 \times 3}$), low-resolution, image feature representations 924, $f_t^r \in \mathbb{R}^{H_r \times w_r \times C_r}$, can be generated by, for example the RGBD-Linguistic Cross Modal Transformer module 134 using a classical CNN 922. Some typical values utilized can include $H_r=W_r=7$, $C_r=2048$. Furthermore, in some embodiments given an initial observed depth-related image 930, depth modality, $d_t \in \mathbb{R}^{h_0 \times w_0}$, can be processed using a CNN 932 pre-trained on a large scale visual navigation task, for example DDPPO, to generate a depth spatial feature representation 934, $f_t^d \in \mathbb{R}^{H_d \times W_d \times C_d}$. In some embodiments, typical values used in DDPPO training can include $H_d=W_d=4$, $C_d=128$.

In some embodiments such as the embodiment of FIG. 9, early fusion 935 of image spatial features 924, $f_t^r$, and depth spatial features 934, $f_t^d$, can be implemented. Specifically, the channel dimension of the spatial image features, $f_t^r$, can be reduced using a 1×1 convolution and average adaptive pooling across spatial dimensions can be performed to reduce the dimensions from $H_r \times W_r$ to $H_d \times W_d$. The final outputs, $f_t^r$ and $f_t^d$, are concatenated along the channel dimension to get a fused RGB-D representation, $i_t$.

In the embodiment of FIG. 9, Equation 3 is implemented as a language encoder transformer 940 by, for example, the language navigation module 130 of the system 100 of FIG. 1 to perform cross attention between linguistic features, $v_t$ and fused RGB-D features, $i_t$. In some embodiments, the cross-modal attention 942 can be performed in two steps. In a first step, the sum of features, $i_t$, and Learned Positional Encoding, $(LPE(i_t))$, are used as query, key and value, $Q_s=K_s=V_s=i_t\ LPE(i_t)$, in Equation 3 to compute self attention features, $\hat{i}_t^s$, in which a spatial 2D positional encoding LPE is learned as opposed to utilizing a fixed positional encoding.

In a second step, the encoding of the semantic map representation, $S_t$, cross modal attention 944 is performed by using fused RGB-D features, $i_t$ + Learned Positional Encoding, $(LPE(i_t))$, as Query and instruction encoding, $v_t$, as Key and Value in Equation 3 to get cross modal attention features, $\hat{i}_t \in \mathbb{R}^{(H_d \times H_d) \times H}$.

In the embodiment of FIG. 9, a late fusion 950 of cross modal semantic map features, $\hat{S}_t$, and RGB-D cross modal features, $\hat{i}_t$, can be performed. That is, in some embodiments average pooling across the spatial dimensions of $\hat{S}_t$ is implemented before concatenating along the hidden size dimension, H, to get a visual-linguistic embedding, $\hat{V}_t^e$.

In the Hybrid Action Decoder module 136 of the embodiment of FIG. 9, to decide on which direction to go next and select the most optimal action, $a_t$, a temporal memory of the previous observed visual-linguistic states, $\hat{V}_t^e$, and previous actions, $a_{t-1}$, is preserved. A neural network, such as a recurrent neural network, RNN, is implemented to preserve the temporal information across time according to equation seven (7), as follows:

$$h_t = LSTM([\hat{V}_t^e, a_{t-1}]). \quad (7)$$

In the embodiment of FIG. 9, an action, $a_t$, can be selected for an agent by keeping track of the completed parts of the instructions, $q_t$, and observed visual-linguistic states, $\hat{V}_t^e$. The temporal information regarding instruction completeness is preserved using, in one embodiment, an action decoder transformer 962 which performs cross attention between hidden states from recurrent network (Equation 7) and instruction encoding, $v_t$. In some embodiments, the cross attention, $TRM(h_t+FPE(h_t),v_t)$, is computed by utilizing recurrent hidden states, $h_t$, as Query and Key, $Q_h=K_h=h_t+FPE(h_t)$, and instruction encoding, $v_t$, as Value in Equation 3. Finally, the probability, $p_t$, of selecting the most optimal action, $a_t$, can be computed at each time-step by employing a feed-forward network followed by softmax according to equation eight (8) as follows:

$$\hat{h}_t^e = TRM(h_t+FPE(h_t),v_t)$$

$$p_t = softmax(M(\hat{h}_t^e)), \quad (8)$$

where $M(\cdot)$ is a multi-layer perceptron and $TRM(\cdot)$ represents the Transformer module.

In some embodiments of the present principles, the Hybrid Action Decoder module 136 performs attention on both temporal sequences (i.e., along time) as well as language sequences. A Hybrid Action Decoder module of the present principles can be necessary for complex task such as VLN-CE and leads to better results than a single-temporal module based on either LSTMs or Transformers alone, such as the LSTM 962 depicted in the Hybrid Action Decoder module 136 of FIG. 9.

In some embodiments, a network/model of the present principles can be trained using a cross entropy loss, $L_{loss}$, computed using ground truth navigable action, $y_t$, and log of the predicted action probability, $p_t$, at step t and according to equation nine (9) as follows:

$$L_{loss} = -\Sigma_t y_t \log(p_t). \quad (9)$$

In some embodiments, two learning approaches, 1) Teacher-Forcing and 2) DAGGER, can be implemented for training a model in accordance with the present principles. Teacher-Forcing is a popular training method for RNNs which minimizes maximum-likelihood loss using ground-truth samples. However, the Teacher-Forcing method suffers from exposure bias problems due to differences in training and inference. To minimize the exposure bias problem in the Teacher-Forcing method the inventors apply DAGGER. In DAGGER, the training data set for iteration N is collected with probability $\beta^N$ (where, $0<\beta<1$) for ground-truth action and current policy action for remaining. The training for iteration N is done using the aggregated dataset collected until iteration N.

In one example, Habitat simulator was used to perform experiments. Specifically, in one embodiment the VLN-CE dataset was used. VLN-CE is built upon the Matterport3D dataset, which is a collection of 90 environments captured through 10,000 high-definition RGB-D panoramas. VLN-CE provides 4475 trajectories followed by an agent inside a Matterport3D simulation environment available in Habitat Simulator. Each trajectory is associated with 3 instructions annotated by humans. The corresponding dataset is divided into training, validation seen and validation unseen splits. In the above example, the training set contains 10819 episodes from 61 scenes, the validation seen set contains 778 episodes from 53 scenes and the validation unseen set contains 1839 episodes from 11 scenes. In some embodiments, the set of scenes in the training splits and the validation unseen splits are disjoint.

In the example, the VLN-CE dataset provides the following low-level actions for each instruction-trajectory pair for navigation inside the Habitat Simulator: move forward 0.25 m, turn-left or turn-right 15 deg, and stop. The trajectories in VLN-CE span 55 steps on average, making the problem realistic and challenging to solve.

In the example, the following standard visual navigation metrics were implemented to evaluate an agent implementing embodiments of the present principles: Success rate (SR), Success weighted by path length (SPL), Normalized Dynamic Time Warping (NDTW), Trajectory Length (TL) and Navigation Error (NE).

For evaluating the example, for Teacher-Forcing training, the models were trained for at most 20 epochs. Early stopping was performed based on the performance of the model on the validation seen dataset. For DAGGER training, the training was started from the model pre-trained with Teacher-Forcing training and then fine-tuned using DAGGER. The number of dataset aggregation rounds, N, for DAGGER was set to 3. $\beta$ was set to 0:75 and as such for the Nth Dagger iteration, the dataset is collected with probability $0:75^N$ for oracle policy actions blended with actions from the agent's policy obtained after training (N−1)th iteration with a probability $(1-0:75^N)$.

For each DAGGER round, 4 epochs of Teacher-Forcing training were performed. All of the models are trained using three RTX 2080 Ti GPUs and Habitat-API version 0.1.5. To avoid loss curve plateauing, an Adam Optimizer with a Cyclical Learning Rate in the range $[2^{-6}; 1^{-4}]$ was used. The cyclic learning rate was varied over a range of epochs. The inflection weighting coefficient for imitation learning was set to 3:2. For individual transformer blocks, a consistent hidden size (H=512), Number of Transformer Heads (nh=4) and size of feedforward layer (sF:F=1024) was used. To improve memory efficiency, the generated semantic map, $S_t$, was down-scaled by a factor of ½. The final dimension of $S_t$ used as an input to the Transformer module was $$\frac{r}{2} \times \frac{r}{2},$$

where r=40. Pre-training for vision components was implemented in the example architecture. Specifically, Imagenet pre-trained Resnet-50 was implemented for RGB and Resnet-50 pre-trained on DDPPO was implemented to compute low-resolution features for visual modalities. The depth and semantic label of pixels from the simulation were used.

FIG. 10 depicts a table of results of the example embodiments of the present principles compared against several baselines, evaluated on VLN-CE dataset. In the embodiment of FIG. 10, Random and Forward-only are trivial non-learning baselines reported to provide context to the performance of learning based baselines. Seq2Seq and CMA are state-of-the-art models on VLN-CE. Seq2Seq-SM and CMA-SM baseline models were implemented by providing additional semantic map input to Seq2Seq and CMA models. In the table of FIG. 10, the best results with DAGGER are displayed in bold and the best results with Teacher-Forcing are underlined.

In the table of FIG. 10, the compared baseline models include: 1) Blind (i.e., Random and Forward-Only): these agents do not process any sensor input and have no learned component. The Random agent randomly performs an action based on the action distribution of a training set. The Forward-Only agent starts with a random heading and takes a fixed number of actions. 2) Sequence to Sequence (Seq2Seq): Seq2Seq agents employs a recurrent policy that takes a representation of instructions and visual observation (RGB and Depth) at each time step and then predicts an action. 3) Sequence to Sequence with Semantics (Seq2Seq-SM): Seq2Seq model which includes additional visual observation, (i.e., semantic map) to aid learning. 4) Cross Modal Matching (CMA): A sequence to sequence model with cross-modal attention and spatial visual reasoning. 5) CMA with Semantics (CMA-SM): CMA Model which includes additional visual observation, (i.e., semantic map) to aid learning. In the table of FIG. 10, the Seq2Seq and CMA are state-of-the-art baseline models in VLN-CE.

In the table of FIG. 10, Seq2Seq-SM and CMA-SM are baselines in accordance with embodiments of the present principles in which base Seq2Seq and CMA models are enhanced by providing semantic map self-attention representation as additional input. The performance of all of the baselines are reported in the table of FIG. 10 with both Teacher-Forcing and DAGGER training.

In the table of FIG. 10, both Validation Seen (val-seen) and Validation Unseen (val-unseen) sets are displayed. It is evident from the table of FIG. 10 that an agent implementing an efficient visual navigation system of the present principles, such as the efficient visual navigation system 100 of FIG. 1, referred to as a SASRA agent in the table of FIG. 10, achieves significant performance improvement over state-of-the-art VLN-CE baseline models (e.g., Seq2Seq and CMA). As depicted in the table of FIG. 10, the Seq2Seq baseline model performs slightly better in val-seen set than the CMA baseline model, however, the CMA baseline model performs slightly better in val-unseen. On the other hand, the SASRA agent of the present principles shows performance improvement compared to both models in both validation sets and within both training regimes. With DAGGER training, the improvement in SPL for a SASRA agent in accordance with the present principles is +5% absolute (+29% relative) in val-unseen and +3% absolute (+9:6% relative) in val-seen compared to the Seq2Seq baseline model. With Teacher-Forcing training, the performance improvement in SPL for the SASRA agent in accordance with the present principles is +5% absolute (+31% relative) in val-unseen and +1% absolute (+4% relative) in val-seen compared the Seq2Seq baseline model. Compared to a CMA agent with DAGGER training, the absolute performance improvement for a SASRA agent in accordance with the present principles in SPL is +4% in valunseen and +8% in val-seen. With teacher-forcing training, the absolute performance improvement in SPL is +3% in val-unseen and +2% in val-seen.

Figure 11:
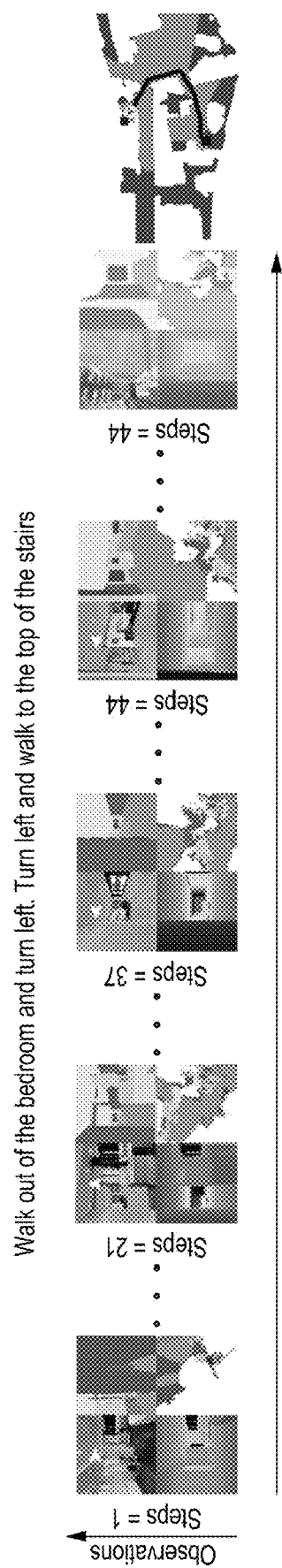
FIG. 11 depicts a graphical representation of a qualitative analysis of a performance of a SASRA agent of the present principles in accordance with one embodiment.

FIG. 11 depicts a graphical representation of a qualitative analysis of a performance of a SASRA agent of the present principles in accordance with one embodiment. FIG. 11 depicts a SASRA agent following a complex sequence of instructions in an unseen environment during testing. In the embodiment of FIG. 11, the agent builds a top-down spatial memory in the form of a semantic map of the present principles and aligns the language and map features to complete the long-horizon navigation task. That is, in the embodiment of FIG. 11, the SASRA agent takes a total of 62 steps to complete a task of walking out of the bedroom, turning left a first time, turning left again, and walking to the top of the stairs. In FIG. 11 it can be observed that the SASRA agent of the present principles is able to follow the instructions correctly and reach the end goal. Although there are multiple instructions of "turn left", the agent is able to turn left with the correct number of steps to effectively reach the goal. In the environment of FIG. 11, there is a staircase going up and down and the goal location is close to that. The SASRA agent of the present principles is able to understand that it is already at the top of stairs on the current floor and does not need to walk up the stairs.

Figure 12:
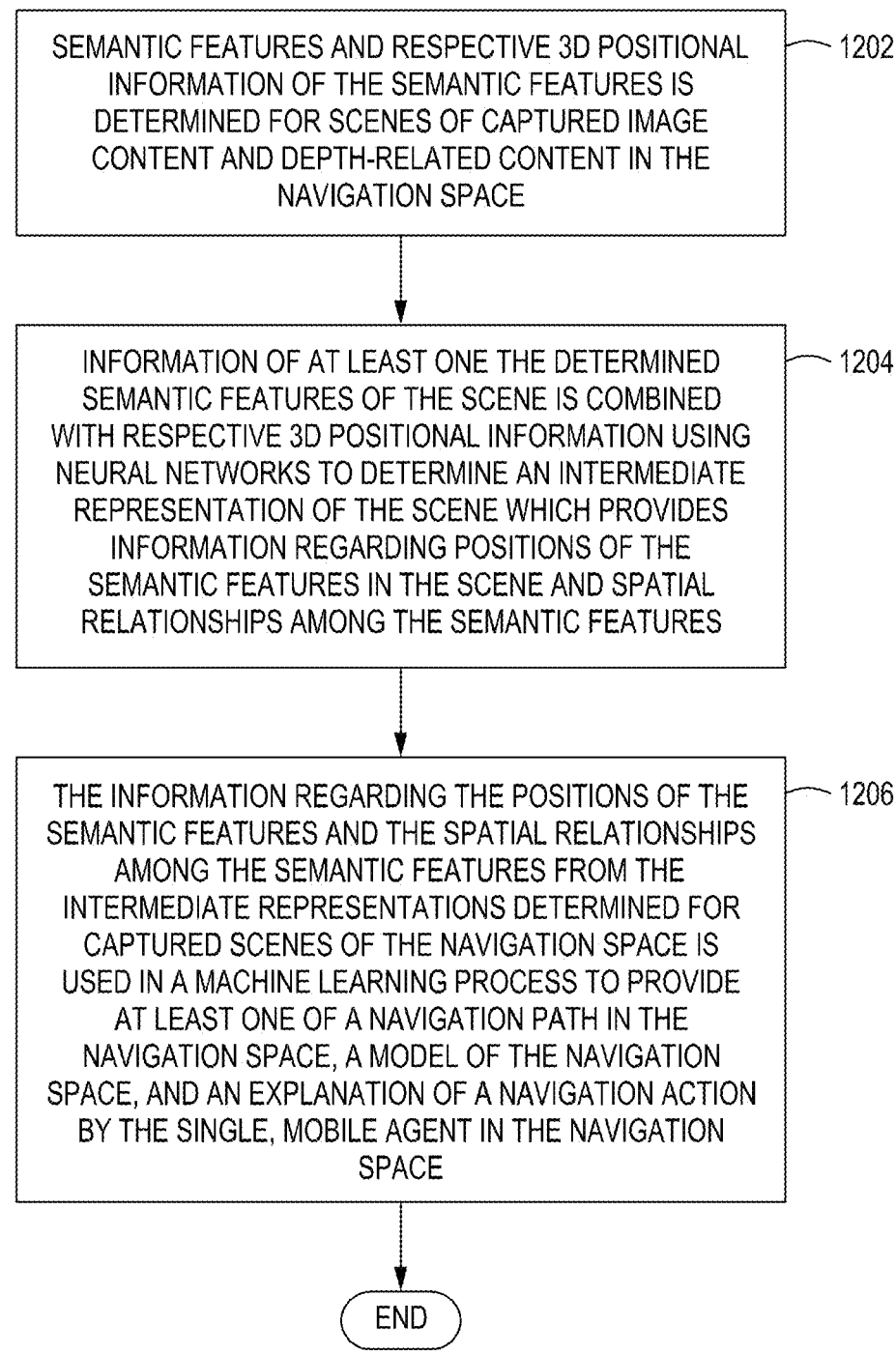
FIG. 12 depicts a flow diagram of a method 1200 for efficient visual navigation in accordance with an embodiment of the present principles.

FIG. 12 depicts a flow diagram of a method 1200 for efficient visual navigation in accordance with an embodiment of the present principles. The method 1200 can begin at 1202 during which semantic features and respective 3D positional information of the semantic features is determined for scenes of captured image content and depth-related content in the navigation space. The method 1200 can proceed to 1204.

At 1204, information of at least one the determined semantic features of the scene is combined with respective 3D positional information using neural networks to determine an intermediate representation of the scene which provides information regarding positions of the semantic features in the scene and spatial relationships among the semantic features. The method 1200 can proceed to 1206.

At 1206, the information regarding the positions of the semantic features and the spatial relationships among the semantic features from the intermediate representations determined for captured scenes of the navigation space is used in a machine learning process to provide at least one of a navigation path in the navigation space, a model of the navigation space, and an explanation of a navigation action by the single, mobile agent in the navigation space. The method 1200 can be exited.

In some embodiments in accordance with the present principles, the method 1200 can further include using the information regarding the positions of the semantic features and the spatial relationships among the semantic features from the intermediate representations determined for captured scenes of the navigation space to train the single, mobile agent to navigate the navigation space, wherein the use of the intermediate representations to train the single, mobile agent reduces an amount of training data required to successfully train the single, mobile agent to navigate the navigation space compared to training instances in which the intermediate representations are not used.

In some embodiments in accordance with the present principles, the method 1200 can further include utilizing at least one region of interest in at least one scene of the captured content to identify which semantic features of the at least one scene of the captured content to include in the intermediate representation.

In some embodiments in accordance with the present principles, the intermediate representation can include at least one of a scene graph and a geometric, semantic map representation.

In some embodiments in accordance with the present principles, the method 1200 can further include identifying a spatial relationship between at least one of semantic features of a scene and positional information of the semantic features of the scene and at least a portion of language instructions provided for navigating through the navigation space.

As depicted in FIG. 1, embodiments of a system for efficient visual navigation of the present principles, such as the system 100 for efficient visual navigation of FIG. 1, can be implemented in a computing device 1300 in accordance with the present principles. That is, in some embodiments, multimodal content, such as RGB images, Lidar images and semantic information of scene images and the like can be communicated to components of the system 100 for efficient visual navigation of FIG. 1 using the computing device 1300 via, for example, any input/output means associated with the computing device 1300. Data associated with a content comprehension and response system in accordance with the present principles can be presented to a user using an output device of the computing device 1300, such as a display, a printer or any other form of output device.

Figure 13:
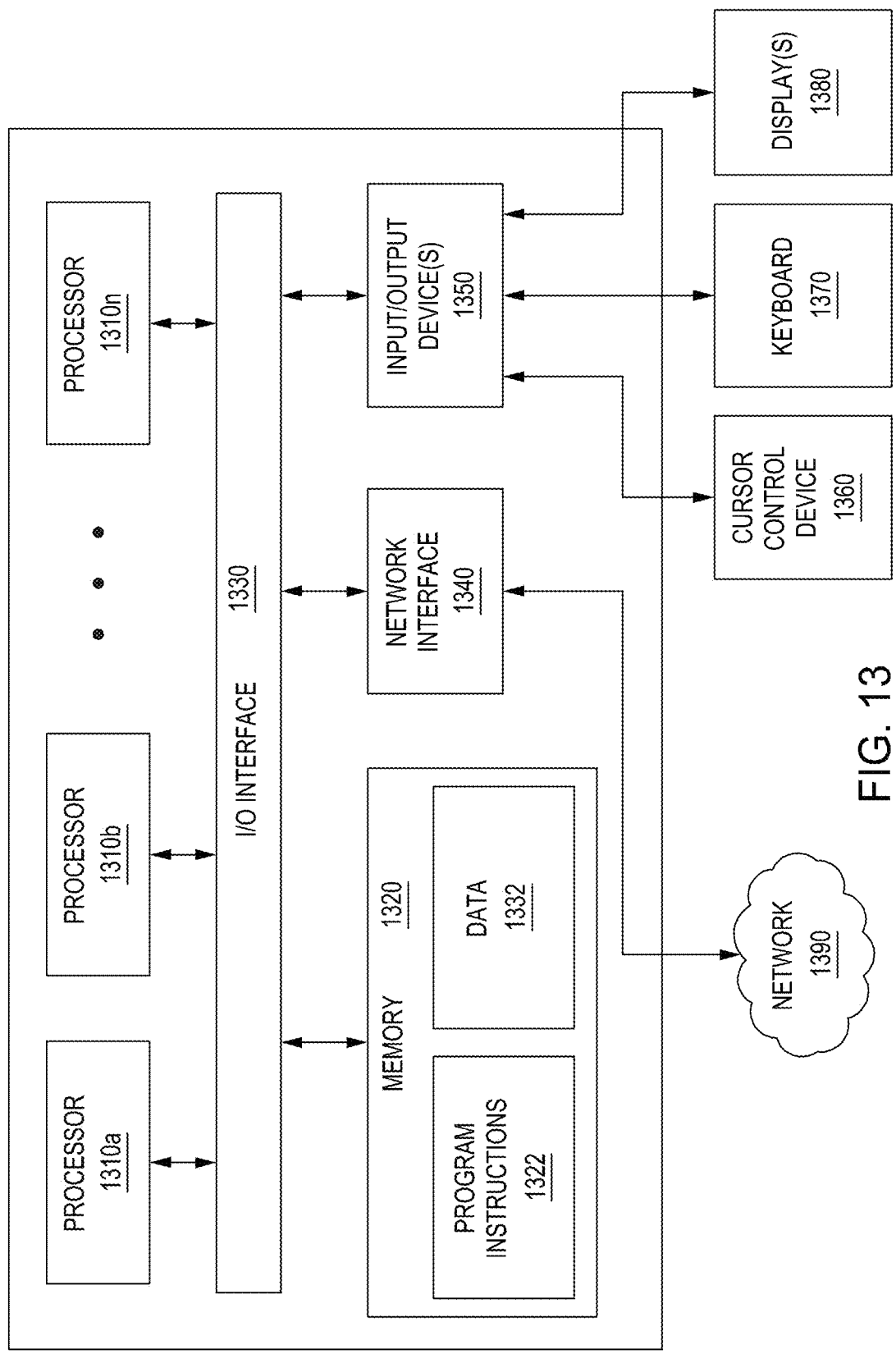
FIG. 13 depicts a high-level block diagram of a computing device suitable for use with embodiments of a system for efficient visual navigation in accordance with an embodiment of the present principles.

For example, FIG. 13 depicts a high-level block diagram of a computing device 1300 suitable for use with embodiments of a system for efficient visual navigation in accordance with the present principles such as the system 100 for efficient visual navigation of FIG. 1. In some embodiments, the computing device 1300 can be configured to implement methods of the present principles as processor-executable executable program instructions 1322 (e.g., program instructions executable by processor(s) 1310) in various embodiments.

In the embodiment of FIG. 13, the computing device 1300 includes one or more processors 1310a-1310n coupled to a system memory 1320 via an input/output (I/O) interface 1330. The computing device 1300 further includes a network interface 1340 coupled to I/O interface 1330, and one or more input/output devices 1350, such as cursor control device 1360, keyboard 1370, and display(s) 1380. In various embodiments, a user interface can be generated and displayed on display 1380. In some cases, it is contemplated that embodiments can be implemented using a single instance of computing device 1300, while in other embodiments multiple such systems, or multiple nodes making up the computing device 1300, can be configured to host different portions or instances of various embodiments. For example, in one embodiment some elements can be implemented via one or more nodes of the computing device 1300 that are distinct from those nodes implementing other elements. In another example, multiple nodes may implement the computing device 1300 in a distributed manner.

In different embodiments, the computing device 1300 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 1300 can be a uniprocessor system including one processor 1310, or a multiprocessor system including several processors 1310 (e.g., two, four, eight, or another suitable number). Processors 1310 can be any suitable processor capable of executing instructions. For example, in various embodiments processors 1310 may be general-purpose or embedded processors implementing any of a variety of instruction set architectures (ISAs). In multiprocessor systems, each of processors 1310 may commonly, but not necessarily, implement the same ISA.

System memory 1320 can be configured to store program instructions 1322 and/or data 1332 accessible by processor 1310. In various embodiments, system memory 1320 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1320. In other embodiments, program instructions and/or data can be received, sent or stored upon different types of computer-accessible media or on similar media separate from system memory 1320 or computing device 1300.

In one embodiment, I/O interface 1330 can be configured to coordinate I/O traffic between processor 1310, system memory 1320, and any peripheral devices in the device, including network interface 1340 or other peripheral interfaces, such as input/output devices 1350. In some embodiments, I/O interface 1330 can perform any necessary protocol, timing or other data transformations to convert data signals from one component (e.g., system memory 1320) into a format suitable for use by another component (e.g., processor 1310). In some embodiments, I/O interface 1330 can include support for devices attached through various types of peripheral buses, such as a variant of the Peripheral Component Interconnect (PCI) bus standard or the Universal Serial Bus (USB) standard, for example. In some embodiments, the function of I/O interface 1330 can be split into two or more separate components, such as a north bridge and a south bridge, for example. Also, in some embodiments some or all of the functionality of I/O interface 1330, such as an interface to system memory 1320, can be incorporated directly into processor 1310.

Network interface 1340 can be configured to allow data to be exchanged between the computing device 1300 and other devices attached to a network (e.g., network 1390), such as one or more external systems or between nodes of the computing device 1300. In various embodiments, network 1390 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1350 can, in some embodiments, include one or more display terminals, keyboards, keypads, touchpads, scanning devices, voice or optical recognition devices, or any other devices suitable for entering or accessing data by one or more computer systems. Multiple input/output devices 1350 can be present in computer system or can be distributed on various nodes of the computing device 1300. In some embodiments, similar input/output devices can be separate from the computing device 1300 and can interact with one or more nodes of the computing device 1300 through a wired or wireless connection, such as over network interface 1340.

Those skilled in the art will appreciate that the computing device 1300 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 1300 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 1300 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 1300 can further include a web browser.

Although the computing device 1300 is depicted as a general purpose computer, the computing device 1300 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 14:
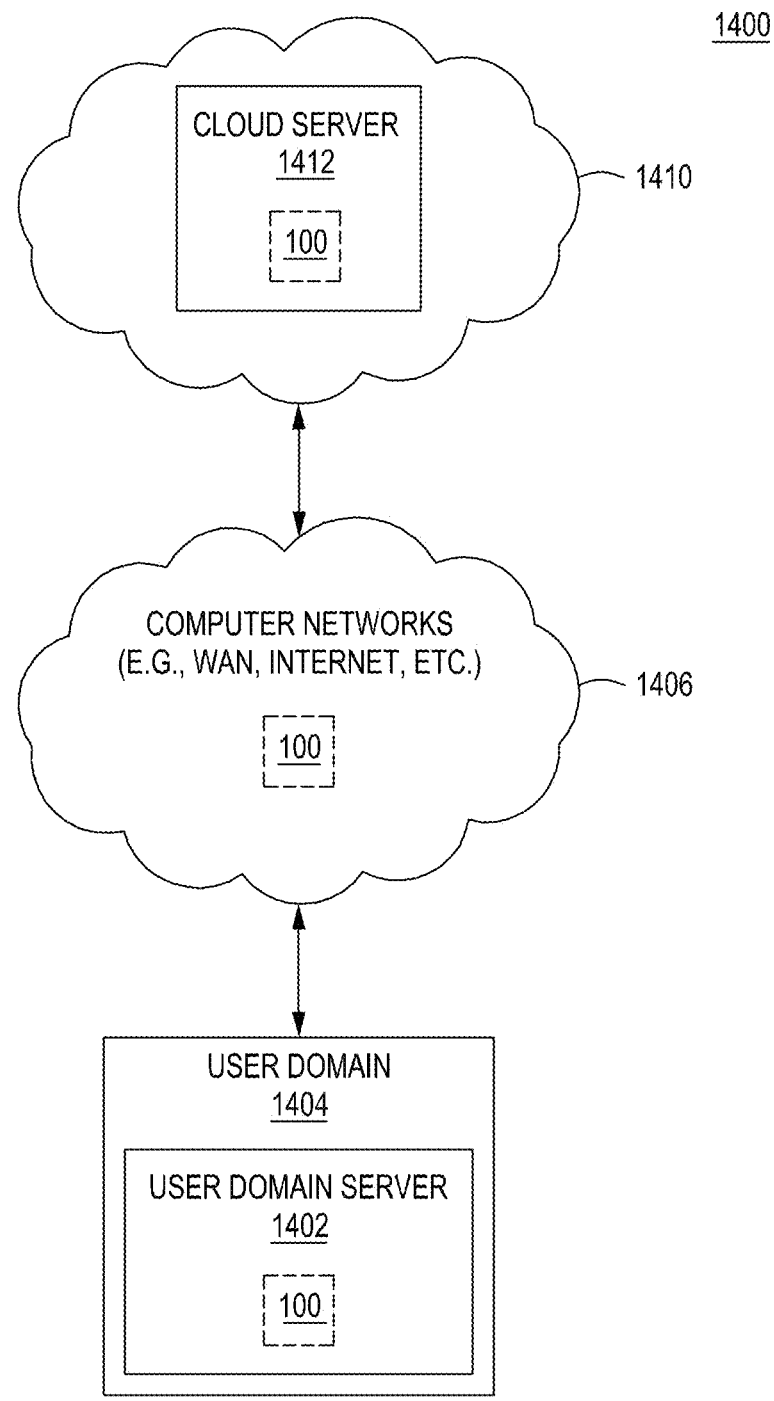
FIG. 14 depicts a high-level block diagram of a network in which embodiments of a system for efficient visual navigation in accordance with the present principles can be applied.

FIG. 14 depicts a high-level block diagram of a network in which embodiments of a system for efficient visual navigation in accordance with embodiments of the present principles, such as the system 100 for efficient visual navigation of FIG. 1, can be applied. The network environment 1400 of FIG. 14 illustratively comprises a user domain 1402 including a user domain server/computing device 1404. The network environment 1400 of FIG. 14 further comprises computer networks 1406, and a cloud environment 1410 including a cloud server/computing device 1412.

In the network environment 1400 of FIG. 14, a system for efficient visual navigation in accordance with the present principles, such as the system 100 for efficient visual navigation of FIG. 1, can be included in at least one of the user domain server/computing device 1404, the computer networks 1406, and the cloud server/computing device 1412. That is, in some embodiments, a user can use a local server/computing device (e.g., the user domain server/computing device 1404) to provide efficient visual navigation in accordance with the present principles.

In some embodiments, a user can implement a system for efficient visual navigation in the computer networks 1406 to provide efficient visual navigation in accordance with the present principles. Alternatively or in addition, in some embodiments, a user can implement a system for efficient visual navigation in the cloud server/computing device 1412 of the cloud environment 1410 to provide efficient visual navigation in accordance with the present principles. For example, in some embodiments it can be advantageous to perform processing functions of the present principles in the cloud environment 1410 to take advantage of the processing capabilities and storage capabilities of the cloud environment 1410. In some embodiments in accordance with the present principles a system for efficient visual navigation can be located in a single and/or multiple locations/servers/computers to perform all or portions of the herein described functionalities of a system in accordance with the present principles. For example, in some embodiments some components of a system for efficient visual navigation of the present principles can be located in one or more than one of the a user domain 1402, the computer network environment 1406, and the cloud environment 1410 while other components of the present principles can be located in at least one of the user domain 1402, the computer network environment 1406, and the cloud environment 1410 for providing the functions described above either locally or remotely.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 1300 can be transmitted to the computing device 1300 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for efficient navigation of a single mobile agent in a navigation space, comprising:
    determining semantic features and respective 3D positional information of the semantic features for scenes of the navigation space using captured image content of the scenes and captured depth-related content of the scenes;
    combining information of the determined semantic features of at least one of the scenes with respective 3D positional information using neural networks to determine an intermediate representation of the at least one of the scenes which provides information regarding positions of the semantic features in the at least one of the scenes and spatial relationships among the semantic features;
    using the information regarding the positions of the semantic features and the spatial relationships among the semantic features from the intermediate representations determined for the at least one of the scenes of the navigation space in a machine learning process to provide at least one of a navigation path in the navigation space, a model of the navigation space, and an explanation of a navigation action by the single, mobile agent in the navigation space; and
    utilizing at least one region of interest in at least one scene of the captured content to identify which semantic features of the at least one scene of the captured content to include in the intermediate representation.

2. The method of claim 1 further comprising;
    using the information regarding the positions of the semantic features and the spatial relationships among the semantic features from the intermediate representations to train the single, mobile agent to at least one of learn and navigate the navigation space, wherein the use of the intermediate representations to train the single, mobile agent reduces an amount of training data required to successfully train the single, mobile agent to navigate the navigation space compared to training instances in which the intermediate representations are not used.

3. The method of claim 1, further comprising:
    applying an attention mechanism to at least one of the intermediate representation of the at least one of the scenes or the at least one of the scenes of the captured content to assist in providing the at least one of a navigation path in the navigation space, the model of the navigation space, and the explanation of a navigation action by the single, mobile agent in the navigation space;
    wherein a focus of the attention mechanism is based on a spatial relationship between at least one of the semantic features of the at least one of the scenes of the captured content or the semantic features in the intermediate representation and the single, mobile agent.

4. The method of claim 1, further comprising:
    training a navigation model for the single, mobile agent by:
        causing sensors associated with the single, mobile agent to capture scenes while traversing multiple environments;
        determining respective intermediate representations for the captured scenes; and inputting information from the respective intermediate representations into a machine learning process for determining the navigation model.

5. The method of claim 4, wherein the navigation model and an inference of a machine learning process are implemented to assist the single, mobile agent to at least one of learn or navigate an unknown environment.

6. The method of claim 1, wherein the intermediate representation comprises a scene graph comprising at least two nodes representative of respective, at least two semantic features of at least one captured scene of the navigation space and at least one edge representative of a spatial relationship between the at least two semantic features of at least one captured scene of the navigation space.

7. The method of claim 1, wherein the intermediate representation comprises a semantic map representation.

8. The method of claim 7, wherein the semantic map representation depicts a spatial relationship between semantic features of captured scenes with respect to a position of the single mobile agent in the navigation space.

9. The method of claim 1, further comprising identifying a spatial relationship between at least one of semantic features of a scene and positional information of the semantic features of the scene and at least a portion of language instructions provided for directing the single, mobile agent through the navigation space.

10. The method of claim 1, further comprising separating semantic features of a scene by class and combining respective classes of semantic features with respective 3D positional information using neural networks to determine an intermediate representation of the scene categorized according to semantic class.

11. The method of claim 1, further comprising predicting a next action for the agent in the navigation space based on a previous action taken by the agent and information from at least one determined intermediate representation.

12. A non-transitory machine-readable medium having stored thereon at least one program, the at least one program including instructions which, when executed by a processor, cause the processor to perform a method in a processor-based system for efficient navigation in a navigation space, comprising:
   determining semantic features and respective 3D positional information of the semantic features for scenes of the navigation space using captured image content of the scenes and captured depth-related content of the scenes;
   combining information of the determined semantic features of at least one of the scenes with respective 3D positional information using neural networks to determine an intermediate representation of the at least one of the scenes which provides information regarding positions of the semantic features in the at least one of the scenes and spatial relationships among the semantic features;
   using the information regarding the positions of the semantic features and the spatial relationships among the semantic features from the intermediate representations determined for the at least one of the scenes of the navigation space in a machine learning process to provide at least one of a navigation path in the navigation space, a model of the navigation space, and an explanation of a navigation action by the single, mobile agent in the navigation space; and
   utilizing at least one region of interest in at least one scene of the captured content to identify which semantic features of the at least one scene of the captured content to include in the intermediate representation.

13. The non-transitory machine-readable medium of claim 12, further comprising:
   using the information regarding the positions of the semantic features and the spatial relationships among the semantic features from the intermediate representations in a deep reinforced learning process to train the single, mobile agent to at least one of learn and navigate the navigation space, wherein the use of the intermediate representations to train the single, mobile agent reduces an amount of training data required to successfully train the single, mobile agent to navigate the navigation space compared to training instances in which the intermediate representations are not used.

14. The non-transitory machine-readable medium of claim 12, further comprising:
   training a navigation model for the agent by:
      causing sensors associated with the single, mobile agent to capture scenes while traversing multiple environments;
      determining respective intermediate representations for the captured scenes; and
      inputting information from the respective intermediate representations into a machine learning process for determining the navigation model, wherein, the navigation model and an inference of a machine learning process are implemented to assist the single, mobile agent to at least one of learn or navigate an unknown environment.

15. The non-transitory machine-readable medium of claim 12, further comprising identifying a spatial relationship between at least one of semantic features of a scene and positional information of the semantic features of the scene and at least a portion of language instructions provided for directing the single, mobile agent through the navigation space.

16. A system for efficient navigation in a navigation space, comprising:
   a processor; and
   a memory coupled to the processor, the memory having stored therein at least one of programs or instructions executable by the processor to configure the system to:
   determine semantic features and respective 3D positional information of the semantic features for scenes of the navigation space using captured image content of the scenes and captured depth-related content of the scenes;
   combine information of the determined semantic features of at least one of the scenes with respective 3D positional information using neural networks to determine an intermediate representation of the at least one of the scenes which provides information regarding positions of the semantic features in the at least one of the scenes and spatial relationships among the semantic features;
   use the information regarding the positions of the semantic features and the spatial relationships among the semantic features from the intermediate representations determined for the at least one of the scenes of the navigation space in a machine learning process to provide at least one of a navigation path in the navigation space, a model of the navigation space, and an explanation of a navigation action by the single, mobile agent in the navigation space; and
   utilize at least one region of interest in at least one scene of the captured content to identify which semantic features of the at least one scene of the captured content to include in the intermediate representation.

17. The system of claim 16, wherein the system is further configured to use the information regarding the positions of the semantic features and the spatial relationships among the semantic features from the intermediate representations to train the single, mobile agent to at least one of learn and navigate the navigation space, wherein the use of the intermediate representations to train the single, mobile agent reduces an amount of training data required to successfully train the single, mobile agent to navigate the navigation space compared to training instances in which the intermediate representations are not used.

18. The system of claim 16, wherein the intermediate representation comprises at least one of a scene graph comprising at least two nodes representative of respective, at least two semantic features of at least one captured scene of the navigation space and at least one edge representative of a spatial relationship between the at least two semantic features of at least one captured scene of the navigation space and a semantic map representation which depicts a spatial relationship between semantic features of captured scenes with respect to a position of the single mobile agent in the navigation space.

19. The system of claim 16, wherein the system is further configured to identify a spatial relationship between at least one of semantic features of a scene and positional information of the semantic features of the scene and at least a portion of language instructions provided for directing the single, mobile agent through the navigation space.

20. The system of claim 16, wherein the system is further configured to separate semantic features of a scene by class and combining respective classes of semantic features with respective 3D positional information using neural networks to determine an intermediate representation of the scene categorized according to semantic class.

21. The system of claim 16, wherein the system is further configured to train a navigation model for the agent by causing sensors associated with the single, mobile agent to capture scenes while traversing multiple environments, determining respective intermediate representations for the captured scenes, and inputting the information from the respective intermediate representations into a machine learning process for determining the navigation model, wherein, the navigation model and an inference of a machine learning process are implemented to assist the single, mobile agent to at least one of learn and navigate an unknown environment.

* * * * *